(12) United States Patent
Okazaki et al.

(10) Patent No.: US 9,835,104 B2
(45) Date of Patent: Dec. 5, 2017

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Shuntaro Okazaki, Shizuoka-ken (JP); Kenji Suzuki, Gotemba (JP); Hiroshi Miyamoto, Susono (JP); Yuji Miyoshi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 67 days.

(21) Appl. No.: 15/083,449

(22) Filed: Mar. 29, 2016

(65) Prior Publication Data

US 2016/0290269 A1    Oct. 6, 2016

(30) Foreign Application Priority Data

Mar. 31, 2015  (JP) .................................. 2015-074258
Nov. 27, 2015  (JP) ................................ 2015-232420

(51) Int. Cl.

| *F01N 11/00* | (2006.01) |
|---|---|
| *F02D 41/14* | (2006.01) |
| *F01N 3/10* | (2006.01) |
| *F01N 13/00* | (2010.01) |
| *F02D 41/24* | (2006.01) |
| *F02D 41/02* | (2006.01) |

(52) U.S. Cl.
CPC .......... *F02D 41/1495* (2013.01); *F01N 3/101* (2013.01); *F01N 11/007* (2013.01);
(Continued)

(58) Field of Classification Search
CPC .... F01N 3/101; F01N 11/007; F01N 2550/00; F01N 2560/025; F01N 2610/03;
(Continued)

(56) References Cited

U.S. PATENT DOCUMENTS 8,683,856 B2    4/2014 Kitaura
2001/0028868 A1*  10/2001 Hashimoto ........... F01N 11/007
                                                            422/177
(Continued)

FOREIGN PATENT DOCUMENTS

| JP | 2003-343339 A | 12/2003 |
|---|---|---|
| JP | 2004-204716 A | 7/2004 |
| JP | 2006-343281 A | 12/2006 |
| WO | 2014/118892 A1 | 8/2014 |

*Primary Examiner* — Jorge Leon, Jr.
(74) *Attorney, Agent, or Firm* — Andrews Kurth Kenyon LLP

(57) ABSTRACT

An exhaust purification system comprising an exhaust purification catalyst, a downstream side air-fuel ratio sensor, and a control device performing air-fuel ratio control for controlling an air-fuel ratio of exhaust gas and abnormality diagnosis control for diagnosing the downstream side air-fuel ratio sensor. In the air-fuel ratio control, the control device alternately and repeatedly switches the air-fuel ratio of the exhaust gas flowing into the exhaust purification catalyst between a rich air-fuel ratio and a lean air-fuel ratio. In the abnormality diagnosis control, the control device judges that the downstream side air-fuel ratio sensor has become abnormal when the air-fuel ratio of the exhaust gas is made the rich air-fuel ratio by the air-fuel control and the output air-fuel ratio of the downstream side air-fuel ratio sensor changes from an air-fuel ratio richer than a predetermined lean judged air-fuel ratio to an lean air-fuel ratio.

14 Claims, 18 Drawing Sheets

(52) U.S. Cl.
CPC ....... *F01N 13/008* (2013.01); *F02D 41/1439* (2013.01); *F02D 41/1454* (2013.01); *F02D 41/1456* (2013.01); *F02D 41/2454* (2013.01); *F01N 2550/00* (2013.01); *F01N 2560/025* (2013.01); *F01N 2610/03* (2013.01); *F01N 2900/0408* (2013.01); *F01N 2900/0416* (2013.01); *F01N 2900/0418* (2013.01); *F01N 2900/1402* (2013.01); *F01N 2900/1624* (2013.01); *F02D 41/0235* (2013.01); *F02D 41/1408* (2013.01); *F02D 41/1475* (2013.01); *F02D 2200/0814* (2013.01); *Y02T 10/47* (2013.01)

(58) Field of Classification Search
CPC ..... F01N 2900/0408; F01N 2900/0416; F01N 2900/0418; F01N 2900/1402; F01N 2900/1624; F02D 41/1408; F02D 41/1456; F02D 41/1475; Y02T 10/47
USPC ................. 60/276, 277, 285, 286, 299, 303
See application file for complete search history.

(56) References Cited

U.S. PATENT DOCUMENTS

| | | |
|---|---|---|
| 2006/0277971 A1 | 12/2006 | Tashiro et al. |
| 2008/0196490 A1* | 8/2008 | Fukagai .............. F02D 41/1456 73/114.72 |
| 2009/0259390 A1* | 10/2009 | Yamaguchi ......... F02D 41/1458 701/109 |
| 2016/0061084 A1 | 3/2016 | Okazaki et al. |

* cited by examiner

FIG. 1
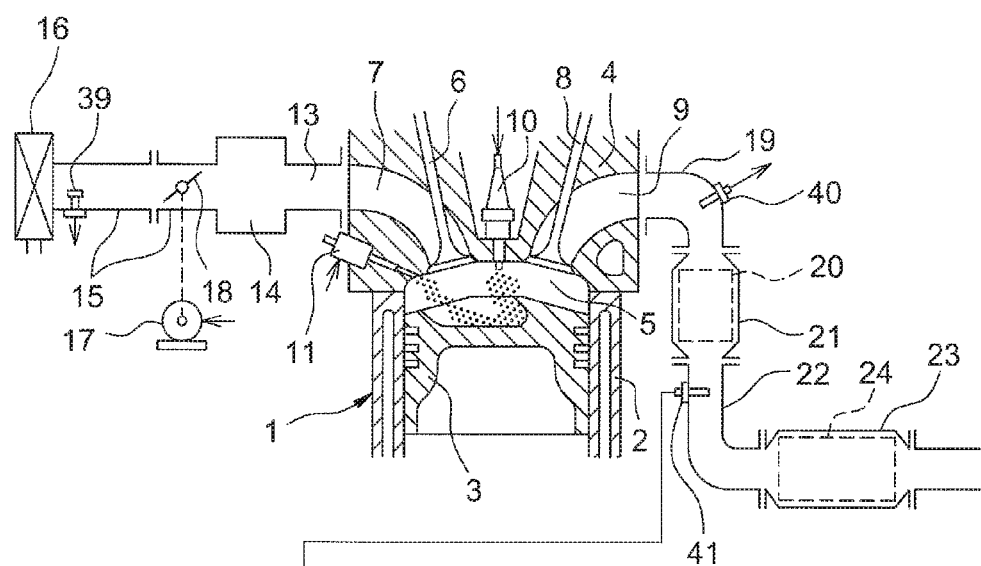
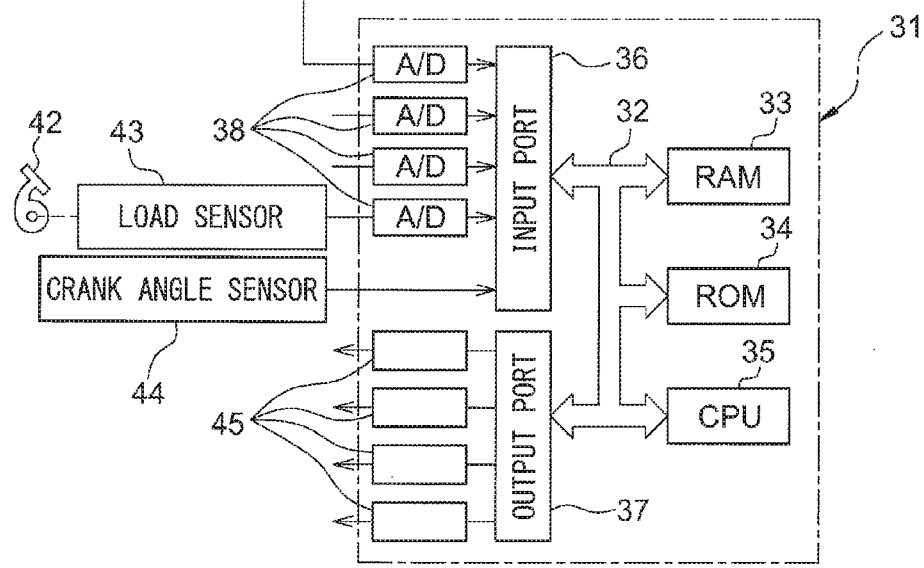

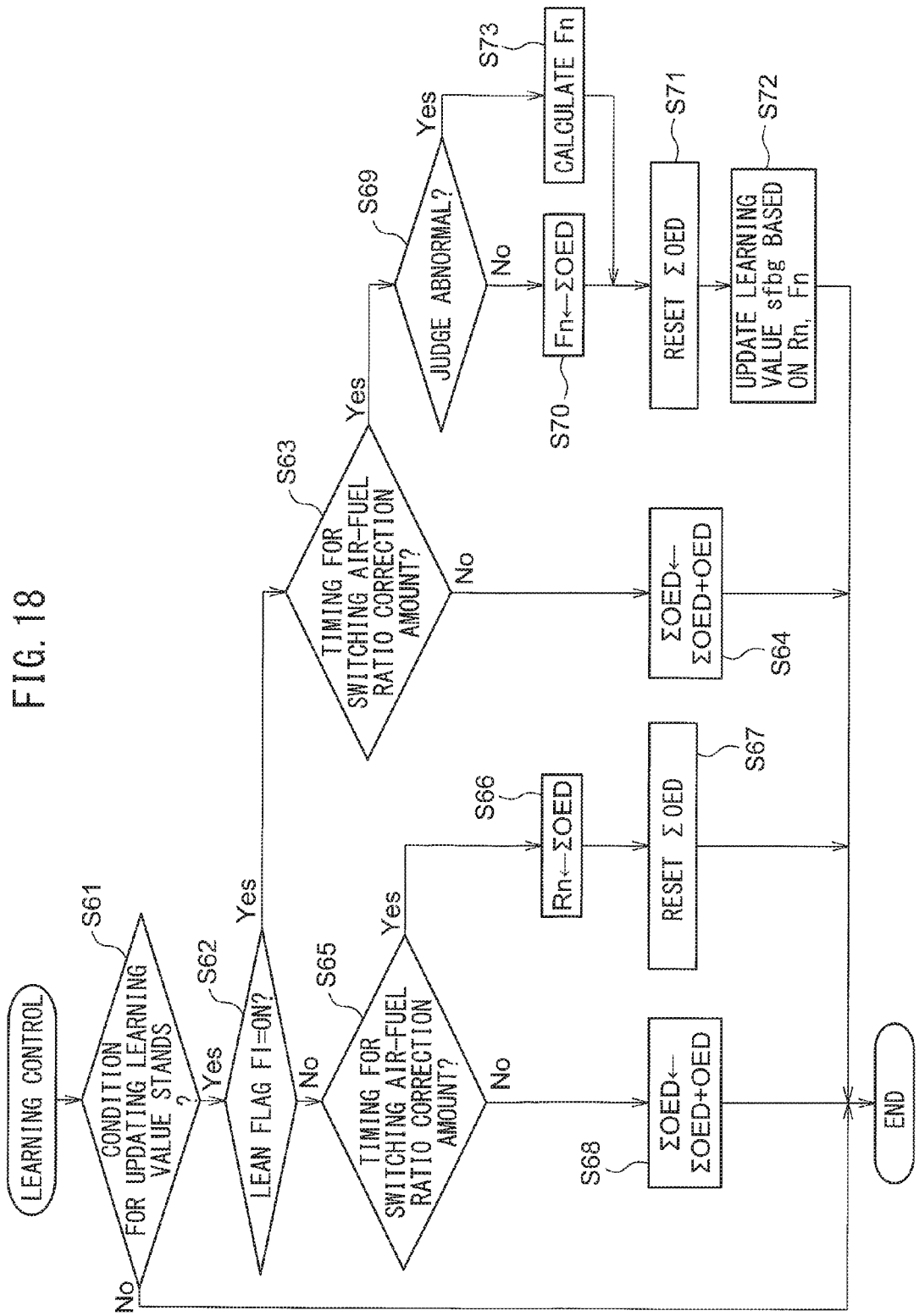

EXHAUST PURIFICATION SYSTEM OF INTERNAL COMBUSTION ENGINE

CROSS-REFERENCE TO RELATED APPLICATIONS

The present application claims priority to Japanese Patent Application Nos. 2015-074258 and 2015-232420 filed on Mar. 31, 2015 and Nov. 27, 2015, respectively, both of which are incorporated herein by reference in their entireties.

TECHNICAL FIELD

The present invention relates to an exhaust purification system of an internal combustion engine.

BACKGROUND ART

Known in the art is an exhaust purification system providing air-fuel ratio sensors at an upstream side in a direction of flow of exhaust and at a downstream side in a direction of flow of exhaust from an exhaust purification catalyst provided in an exhaust passage of an internal combustion engine. In such an internal combustion engine, the output of the upstream side air-fuel ratio sensor is used as the basis for feedback control so that the air-fuel ratio of the exhaust gas flowing into the exhaust purification catalyst becomes a target air-fuel ratio. In addition, the target air-fuel ratio is alternately set to an air-fuel ratio richer than a stoichiometric air-fuel ratio (below, simply referred to as the "rich air-fuel ratio") and an air-fuel ratio leaner than the stoichiometric air-fuel ratio (below, simply referred to as the "lean air-fuel ratio") (for example, PLT 1).

In particular, in the internal combustion engine which is described in PLT 1, when an air-fuel ratio corresponding to an output of the downstream side air-fuel ratio sensor (below, also referred to as the "output air-fuel ratio") becomes a rich judged air-fuel ratio richer than the stoichiometric air-fuel ratio or becomes a smaller ratio, the target air-fuel ratio is switched to the lean air-fuel ratio, while when an oxygen storage amount of the exhaust purification catalyst becomes a predetermined switching reference storage amount smaller than the maximum storable oxygen amount or becomes a larger amount, the target air-fuel ratio is switched to the rich air-fuel ratio. According to PLT 1, due to this, it is considered possible to suppress the outflow of $NO_x$ from the exhaust purification catalyst.

CITATION LIST

Patent Literature

PLT 1. International Publication No. 2014/118892A
PLT 2. Japanese Patent Publication No. 2006-343281A

SUMMARY OF INVENTION

Technical Problem

In this regard, when an element forming the air-fuel ratio sensor cracks and the air-fuel ratio of the exhaust gas around the air-fuel ratio sensor is substantially the stoichiometric air-fuel ratio or lean air-fuel ratio, the output air-fuel ratio of the air-fuel ratio sensor becomes substantially equal to the actual air-fuel ratio of the exhaust gas. However, when the air-fuel ratio of the exhaust gas around the air-fuel ratio sensor is the rich air-fuel ratio, the output air-fuel ratio of the air-fuel ratio sensor sometimes becomes an air-fuel ratio different from the actual air-fuel ratio of the exhaust gas, in particular a lean air-fuel ratio.

In this way, when an air-fuel ratio sensor suffers from a cracked element, sometimes it is not possible to accurately detect the air-fuel ratio of the exhaust gas around the air-fuel ratio sensor. If using an air-fuel ratio sensor generating a mistaken output caused by a cracked element in this way so as to perform the above-mentioned such control of the target air-fuel ratio, sometimes it is no longer possible to suppress the outflow of $NO_x$ etc. from the exhaust purification catalyst.

Therefore, in view of the above problem, an object of the present invention is to provide an exhaust purification system of an internal combustion engine which can diagnose abnormality when a downstream side air-fuel ratio sensor suffers from the abnormality of a cracked element.

Solution to Problem

In order to solve the above problem, in a first invention, there is provided an exhaust purification system of an internal combustion engine comprising an exhaust purification catalyst provided in an exhaust passage of the internal combustion engine, a downstream side air-fuel ratio sensor provided in the exhaust passage at a downstream side of the exhaust purification catalyst in the direction of flow of exhaust, and a control device performing air-fuel ratio control for controlling an air-fuel ratio of exhaust gas flowing into the exhaust purification catalyst and abnormality diagnosis control for diagnosing the downstream side air-fuel ratio sensor for abnormality based on an output air-fuel ratio of the downstream side air-fuel ratio sensor, wherein, in the air-fuel ratio control, the control device alternately and repeatedly switches the air-fuel ratio of the exhaust gas flowing into the exhaust purification catalyst between a rich air-fuel ratio richer than the stoichiometric air-fuel ratio and a lean air-fuel ratio leaner than the stoichiometric air-fuel ratio, and, in the abnormality diagnosis control, the control device judges that the downstream side air-fuel ratio sensor has become abnormal when the air-fuel ratio of the exhaust gas flowing into the exhaust purification catalyst is made the rich air-fuel ratio by the air-fuel control and the output air-fuel ratio of the downstream side air-fuel ratio sensor changes from an air-fuel ratio richer than a predetermined lean judged air-fuel ratio leaner than the stoichiometric air-fuel ratio to an air-fuel ratio leaner than the lean judged air-fuel ratio.

In a second invention, in the air-fuel ratio control, the control device further performs feedback control of the amount of fuel fed to a combustion chamber of the internal combustion engine so that the air-fuel ratio of the exhaust gas flowing into the exhaust purification catalyst becomes a target air-fuel ratio, and learning control correcting a parameter relating to the air-fuel ratio based on the output air-fuel ratio of the downstream side air-fuel ratio sensor, in the air-fuel control, the control device alternately switches the target air-fuel ratio between a rich air-fuel ratio and a lean air-fuel ratio and, when the output air-fuel ratio of the downstream side air-fuel ratio sensor becomes a predetermined rich judged air-fuel ratio richer than the stoichiometric air-fuel ratio or becomes less, switches the target air-fuel ratio from the rich air-fuel ratio to the lean air-fuel ratio, in the learning control, the control device corrects a parameter relating to the air-fuel ratio based on a cumulative oxygen excess amount, which is a cumulative value of an amount of oxygen becoming in excess when trying to make the air-fuel ratio of the exhaust gas flowing into the exhaust purification catalyst the stoichiometric air-fuel ratio in an oxygen increase time period from when switching the target air-fuel ratio to the lean air-fuel ratio to when again switching it to the rich air-fuel ratio, and a cumulative oxygen deficiency amount, which is a cumulative value of an amount of oxygen becoming deficient when trying to make the air-fuel ratio of the exhaust gas flowing into the exhaust purification catalyst the stoichiometric air-fuel ratio in an oxygen decrease time period from when switching the target air-fuel ratio to the rich air-fuel ratio to when again switching it to the lean air-fuel ratio, so that the difference between the cumulative oxygen excess amount and the cumulative oxygen deficiency amount becomes smaller and, if judging that the downstream side air-fuel ratio sensor has become abnormal when the target air-fuel ratio is set to the rich air-fuel ratio, the control device stops correction of the parameter relating to the air-fuel ratio based on the cumulative oxygen deficiency amount at this time even if after that the output air-fuel ratio of the downstream side air-fuel ratio sensor becomes the rich judged air-fuel ratio or less and the target air-fuel ratio is switched to the lean air-fuel ratio in the first invention.

In a third invention, when the target air-fuel ratio is set to the rich air-fuel ratio, the output air-fuel ratio of the downstream side air-fuel ratio sensor changes from an air-fuel ratio richer than the lean judged air-fuel ratio to an air-fuel ratio leaner than the lean judged air-fuel ratio, and thereby it is judged that the downstream side air-fuel ratio sensor has become abnormal, the control device calculates the cumulative oxygen deficiency amount in the time period from when switching the target air-fuel ratio to the rich air-fuel ratio the last time to when the output air-fuel ratio of the downstream side air-fuel ratio sensor changes from an air-fuel ratio richer than the lean judged air-fuel ratio to an air-fuel ratio leaner than the lean judged air-fuel ratio, and corrects the parameter relating to the air-fuel ratio so that the difference between the cumulative oxygen deficiency amount and the cumulative oxygen excess amount becomes smaller in the second invention.

In a forth invention, alternately switches the target air-fuel ratio between a constant rich set air-fuel ratio richer than the stoichiometric air-fuel ratio and a constant lean set air-fuel ratio leaner than the stoichiometric air-fuel ratio, and the control device makes the rich degree of the rich set air-fuel ratio smaller if judging that the downstream side air-fuel ratio sensor has become abnormal by the abnormal diagnosis control in the second or third invention.

In a fifth invention, in the air-fuel ratio control, if defining a time period setting the target air-fuel ratio to the rich air-fuel ratio and lean air-fuel ratio one time each as one cycle, the control device makes the rich degree of the rich set air-fuel ratio smaller if a ratio of the number of times it was judged that the downstream side air-fuel ratio sensor has become abnormal with respect to the number of times of the cycle is a predetermined ratio or more in the fourth invention.

In a sixth invention, in the air-fuel ratio control, the control device switches the air-fuel ratio of the exhaust gas flowing into the exhaust purification catalyst from the rich air-fuel ratio to the lean air-fuel ratio when the output air-fuel ratio of the downstream side air-fuel ratio sensor becomes a predetermined rich judged air-fuel ratio richer than the stoichiometric air-fuel ratio or becomes less, and switches the air-fuel ratio of the exhaust gas flowing into the exhaust purification catalyst from the lean air-fuel ratio to the rich air-fuel ratio when an oxygen storage amount of the exhaust purification catalyst becomes a predetermined switching reference oxygen amount smaller than a maximum storable oxygen amount or becomes more in any one of the first to fifth inventions.

According to the present invention, there is provided an exhaust purification system of an internal combustion engine which can diagnose abnormality when a downstream side air-fuel ratio sensor suffers from the abnormality of a cracked element.

BRIEF DESCRIPTION OF DRAWINGS

FIG. 1 is a view schematically showing an internal combustion engine in which the abnormality diagnosis device of the present invention is used.

FIG. 18 is a flow chart showing a control routine of learning control.

DESCRIPTION OF EMBODIMENTS

Figure 2:
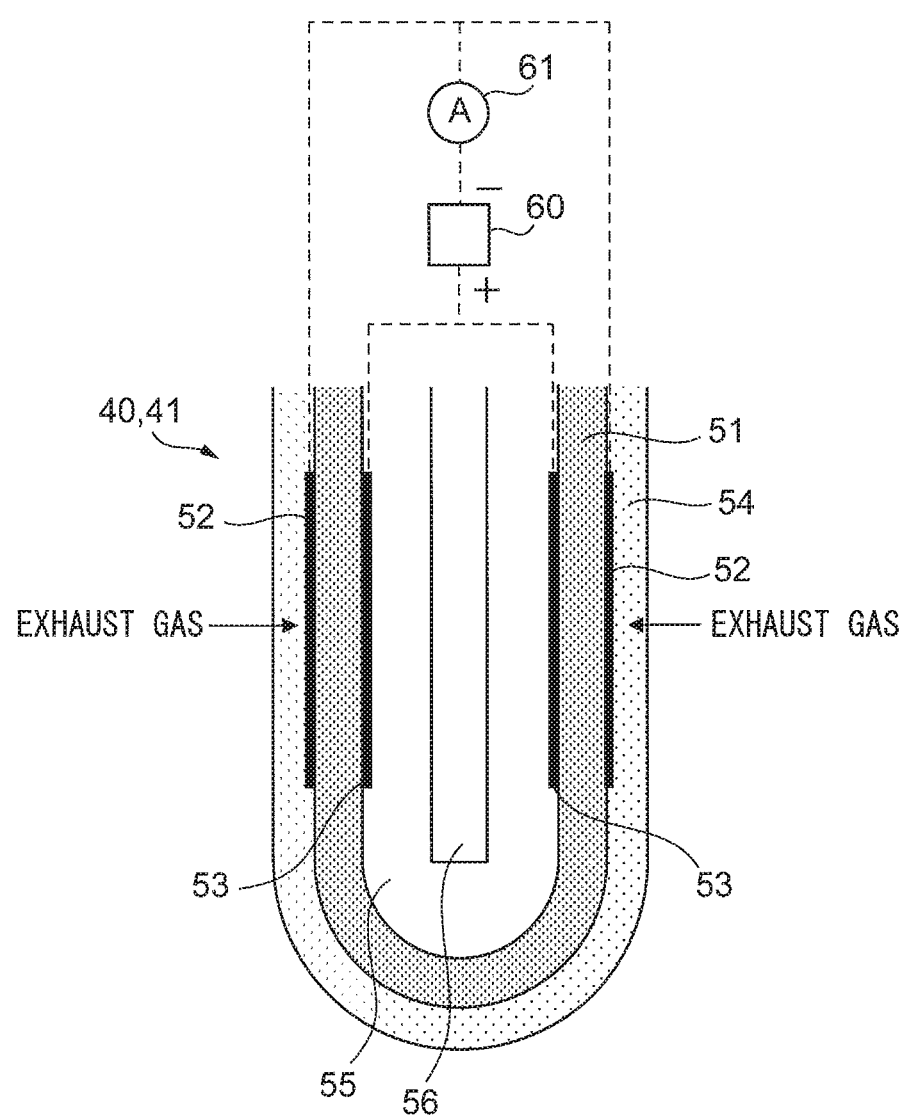
FIG. 2 is a schematic cross-sectional view of an air-fuel ratio sensor.

Below, referring to the drawings, an embodiment of the present invention will be explained in detail. Note that, in the following explanation, similar component elements are assigned the same reference numerals.

<Explanation of Internal Combustion Engine as a Whole>

FIG. 1 is a view which schematically shows an internal combustion engine in which an exhaust purification system according to a first embodiment of the present invention is used. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine using the exhaust purification system of the present invention may also use fuel other than gasoline, or mixed fuel with gasoline.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 is arranged which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36. Note that, the configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as a control device performing air-fuel ratio control for controlling an air-fuel ratio of the exhaust gas flowing into the upstream side exhaust purification catalyst 20, and abnormality diagnosis control for diagnosing the downstream side air-fuel ratio sensor 41 for abnormality based on the output air-fuel ratio of the downstream side air-fuel ratio sensor 41.

The upstream side exhaust purification catalyst 20 and the downstream side exhaust purification catalyst 24 are three-way catalysts which have an oxygen storage ability. Specifically, the exhaust purification catalysts 20 and 24 are three-way catalysts which comprises a carrier made of ceramic on which a precious metal (for example, platinum Pt) having a catalyst effect and a substance having an oxygen storage ability (for example, ceria $CeO_2$) are carried. A three-way catalyst has the function of simultaneously purifying unburned HC, CO and $NO_x$ when the air-fuel ratio of the exhaust gas flowing into the three-way catalyst is maintained at the stoichiometric air-fuel ratio. In addition, when the exhaust purification catalysts 20 and 24 store a certain extent of oxygen, the unburned HC and CO and $NO_x$ are simultaneously purified even if the air-fuel ratio of the exhaust gas flowing into the exhaust purification catalysts 20 and 24 somewhat deviates from the stoichiometric air-fuel ratio to the rich side or lean side.

Accordingly, if the exhaust purification catalysts 20 and 24 have an oxygen storage ability, that is, if the oxygen storage amount of the exhaust purification catalysts 20 and 24 is less than the maximum storage oxygen amount, when the air-fuel ratio of the exhaust gas flowing into the exhaust purification catalysts 20, 24 becomes somewhat leaner than the stoichiometric air-fuel ratio, the excess oxygen contained in the exhaust gas is stored in the exhaust purification catalysts 20, 24. Therefore, the surfaces of the exhaust purification catalysts 20 and 24 are maintained at the stoichiometric air-fuel ratio. As a result, on the surfaces of the exhaust purification catalysts 20 and 24, the unburned HC, CO and $NO_x$ are simultaneously purified. At this time, the air-fuel ratio of the exhaust gas flowing out from the exhaust purification catalysts 20 and 24 becomes the stoichiometric air-fuel ratio.

On the other hand, if exhaust purification catalysts 20 and 24 can release oxygen, that is, the oxygen storage amount of the exhaust purification catalysts 20 and 24 is more than zero, when the air-fuel ratio of the exhaust gas flowing into the exhaust purification catalysts 20, 24 becomes somewhat richer than the stoichiometric air-fuel ratio, the oxygen which is insufficient for reducing the unburned HC and CO contained in the exhaust gas, is released from the exhaust purification catalysts 20 and 24. Therefore, the surfaces of the exhaust purification catalysts 20 and 24 are maintained at the stoichiometric air-fuel ratio. As a result, on the surfaces of the exhaust purification catalysts 20 and 24, the unburned HC, CO and $NO_x$ are simultaneously purified. At this time, the air-fuel ratio of the exhaust gas flowing out from the exhaust purification catalysts 20 and 24 becomes the stoichiometric air-fuel ratio.

In this way, when the exhaust purification catalysts 20 and 24 store a certain extent of oxygen, even if the air-fuel ratio of the exhaust gas flowing into the exhaust purification catalysts 20 and 24 deviates somewhat from the stoichiometric air-fuel ratio to the rich side or lean side, the unburned HC, CO and $NO_x$ are simultaneously purified and the air-fuel ratio of the exhaust gas flowing out from the exhaust purification catalysts 20 and 24 becomes the stoichiometric air-fuel ratio.

<Explanation of Air-Fuel Ratio Sensor>

In the present embodiment, as the air-fuel ratio sensors 40 and 41, cup type limit current type air-fuel ratio sensors are used. FIG. 2 will be used to simply explain the structures of the air-fuel ratio sensors 40 and 41. Each of the air-fuel ratio sensors 40 and 41 is provided with a solid electrolyte layer 51, an exhaust side electrode 52 which is arranged on one side surface of the same, an atmosphere side electrode 53 which is arranged on the other side surface, a diffusion regulation layer 54 which regulates the diffusion of the flowing exhaust gas, a reference gas chamber 55, and a heater part 56 which heats the air-fuel ratio sensor 40 or 41, in particular the solid electrolyte layer 51.

In particular, in each of the cup type air-fuel ratio sensors 40 and 41 of the present embodiment, the solid electrolyte layer 51 is formed into a cylindrical shape with one closed end. Inside of the reference gas chamber 55 which is defined inside of the solid electrolyte layer 51, atmospheric gas (air) is introduced and the heater part 56 is arranged. On the inside surface of the solid electrolyte layer 51, an atmosphere side electrode 53 is arranged. On the outside surface of the solid electrolyte layer 51, an exhaust side electrode 52 is arranged. On the outside surfaces of the solid electrolyte layer 51 and the exhaust side electrode 52, a diffusion regulation layer 54 is arranged to cover the same. Note that, at the outside of the diffusion regulation layer 54, a protective layer (not shown) may be provided for preventing a liquid etc. from depositing on the surface of the diffusion regulation layer 54.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 are formed by platinum or other precious metal with a high catalytic activity.

Further, between the exhaust side electrode 52 and the atmosphere side electrode 53, sensor voltage V is supplied by the voltage control device 60 which is mounted on the ECU 31. In addition, the ECU 31 is provided with a current detection portion 61 which detects the current I which flows between these electrodes 52 and 53 through the solid electrolyte layer 51 when the sensor voltage V is applied. The current which is detected by this current detection portion 61 is the output current I of the air-fuel ratio sensors 40 and 41.

Figure 3:
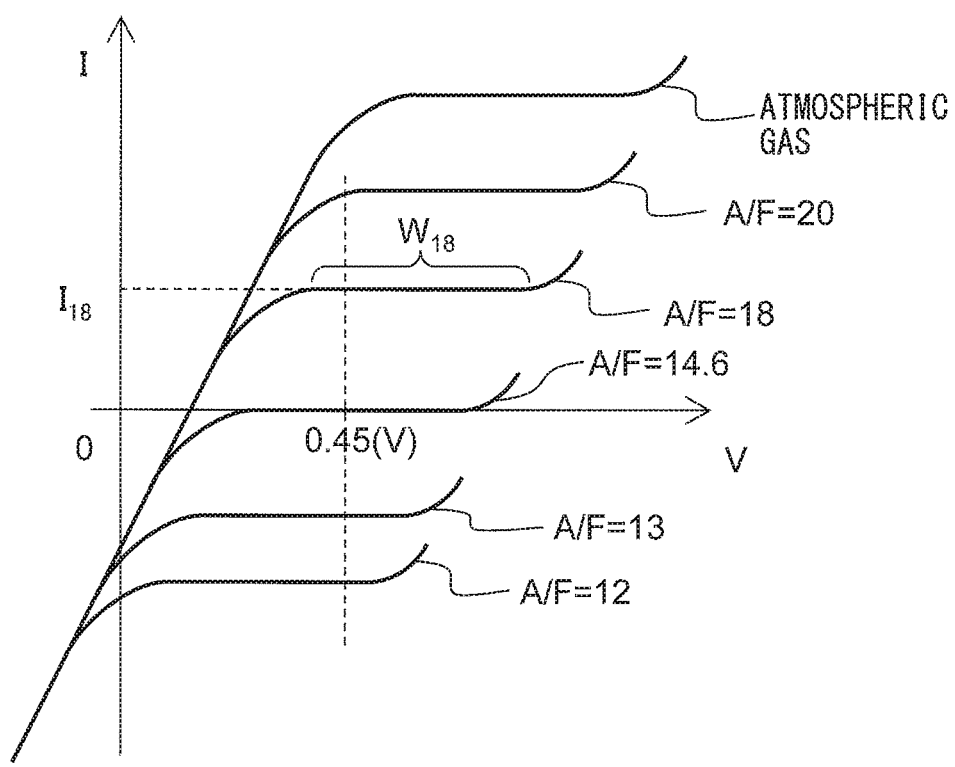
FIG. 3 is a view showing a relationship of an applied voltage V and output current I at different exhaust air-fuel ratios A/F.

The thus configured air-fuel ratio sensors 40 and 41 have the voltage-current (V-I) characteristic such as shown in FIG. 3. As will be understood from FIG. 3, the output current I of the air-fuel ratio sensors 40 and 41 becomes larger the higher (leaner) the air-fuel ratio of the exhaust gas, i.e., the exhaust air-fuel ratio A/F. Further, at the line V-I of each exhaust air-fuel ratio A/F, there is a region parallel to the sensor voltage V axis, that is, a region where the output current I does not change much at all even if the sensor voltage V changes. This voltage region is called the "limit current region". The current at this time is called the "limit current". In FIG. 3, the limit current region and limit current when the exhaust air-fuel ratio is 18 are shown by $W_{18}$ and $I_{18}$, respectively.

Figure 4:
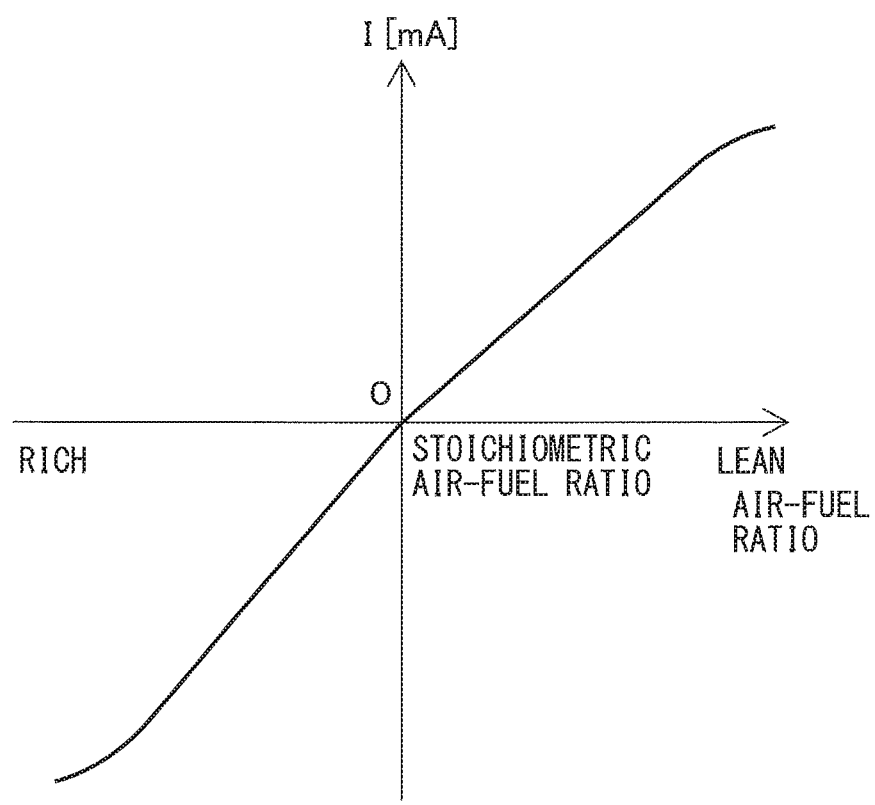
FIG. 4 is a view showing a relationship between an air-fuel ratio and output current I when making the applied voltage V constant.

FIG. 4 is a view which shows the relationship between the exhaust air-fuel ratio and the output current I when making the supplied voltage V constant at about 0.45V (FIG. 3). As will be understood from FIG. 4, in the air-fuel ratio sensors 40 and 41, the output current changes linearly (proportionally) changes with respect to the exhaust air-fuel ratio so that the higher (i.e., the leaner) the exhaust air-fuel ratio, the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio.

Note that, as the air-fuel ratio sensors 40 and 41, instead of the limit current type air-fuel ratio sensor having the structure shown in FIG. 2, it is also possible to use a layered-type limit current type air-fuel ratio sensor.

<Basic Air-Fuel Ratio Control>

Next, the basic air-fuel ratio control in the internal combustion engine of the present embodiment will be summarized. In the air-fuel ratio control in the present embodiment, feedback control is performed based on the output air-fuel ratio of the upstream side air-fuel ratio sensor 40 to control the fuel injection amount from the fuel injector 11 so that the output air-fuel ratio of the upstream side air-fuel ratio sensor 40 becomes the target air-fuel ratio. That is, in the air-fuel ratio control in the present embodiment, feedback control is performed based on the output air-fuel ratio of the upstream side air-fuel ratio sensor 40 so that the air-fuel ratio of the exhaust gas flowing into the upstream side exhaust purification catalyst 20 becomes the target air-fuel ratio. Note that, the "output air-fuel ratio" means the air-fuel ratio which corresponds to the output value of the air-fuel ratio sensor.

Further, in the air-fuel ratio control of the present embodiment, target air-fuel ratio is set based on the output air-fuel ratio of the downstream side air-fuel ratio sensor 41, etc. Specifically, when the output air-fuel ratio of the downstream side air-fuel ratio sensor 41 becomes a rich air-fuel ratio, the target air-fuel ratio is set to a lean set air-fuel ratio. As a result, the air-fuel ratio of exhaust gas flowing into the upstream side exhaust purification catalyst 20 also becomes the lean set air-fuel ratio. In this case, "lean set air-fuel ratio" is a predetermined constant air-fuel ratio which is leaner than the stoichiometric air-fuel ratio (air-fuel ratio serving as center of control) by a certain extent, and, for example, is 14.65 to 20, preferably 14.65 to 18, more preferably 14.65 to 16 or so. Further, the lean set air-fuel ratio can be expressed as an air-fuel ratio acquired by adding a positive air-fuel correction amount to an air-fuel ratio serving as a control center (in the present embodiment, the stoichiometric air-fuel ratio). In addition, in the present embodiment, when the output air-fuel ratio of the downstream side air-fuel ratio sensor 41 becomes a rich judged air-fuel ratio (for example, 14.55), which is slightly richer than the stoichiometric air-fuel ratio, or less, it is judged that the output air-fuel ratio of the downstream side air-fuel ratio sensor 41 has become the rich air-fuel ratio.

If the target air-fuel ratio is changed to the lean set air-fuel ratio, the oxygen excess/deficiency of the exhaust gas which flows into the upstream side exhaust purification catalyst 20 is cumulatively added. The "oxygen excess/deficiency"

means an amount of the oxygen which becomes excessive or the oxygen which becomes deficient (excess HC, CO, etc., (below, referred to as unburned gas)) when trying to make the air-fuel ratio of the exhaust gas which flows into the upstream side exhaust purification catalyst 20 the stoichiometric air-fuel ratio. In particular, when the target air-fuel ratio is the lean set air-fuel ratio, the exhaust gas which flows into the upstream side exhaust purification catalyst 20 becomes excessive in oxygen. This excess oxygen is stored in the upstream side exhaust purification catalyst 20. Therefore, the cumulative value of the oxygen excess/deficiency (below, also referred to as the "cumulative oxygen excess/deficiency") can be said to express the estimated value of the oxygen storage amount OSA of the upstream side exhaust purification catalyst 20.

Note that, the oxygen excess/deficiency is calculated based on the output air-fuel ratio of the upstream side air-fuel ratio sensor 40, and the estimated value of the intake air amount to the inside of the combustion chamber 5 which is calculated based on the output of the air flow meter 39, etc. or the fuel feed amount of the fuel injector 11, etc. Specifically, the oxygen excess/deficiency OED is, for example, calculated by the following formula (1):

$$OED = 0.23 \times Qi \times (AFup - AFR) \quad (1)$$

where 0.23 indicates the concentration of oxygen in the air, Qi indicates the amount of fuel injection, AFup indicates the output air-fuel ratio of the upstream side air-fuel ratio sensor 40, and AFR indicates an air-fuel ratio serving as control center (in the present embodiment, basically stoichiometric air-fuel ratio).

If the cumulative oxygen excess/deficiency acquired by cumulatively adding the thus calculated oxygen excess/deficiency becomes the predetermined switching reference value (which corresponds to a predetermined switching reference storage amount Cref) or more, i.e., in the embodiment of the present invention it becomes the predetermined switching reference amount Cref or more, the target air-fuel ratio which had up to then been the lean set air-fuel ratio is set to the rich set air-fuel ratio. The rich set air-fuel ratio is a predetermined air-fuel ratio which is a certain degree richer than the stoichiometric air-fuel ratio (the air-fuel ratio serving as control center), and is for example 12 to 14.58, preferably 13 to 14.57, more preferably 14 to 14.55 or so. Further, the rich set air-fuel ratio can be expressed as an air-fuel ratio acquired by adding a negative air-fuel ratio correction amount to an air-fuel ratio serving as a control center (in the present embodiment, the stoichiometric air-fuel ratio). Note that, in the present embodiment, the difference of the rich set air-fuel ratio from the stoichiometric air-fuel ratio (rich degree) is made the difference of the lean set air-fuel ratio from the stoichiometric air-fuel ratio (lean degree) or less.

After this, when the output air-fuel ratio of the downstream side air-fuel ratio sensor 41 again becomes the rich judged air-fuel ratio or less, the target air-fuel ratio is again made the lean set air-fuel ratio. Then, a similar operation is repeated. In this way, in the present embodiment, the target air-fuel ratio of the exhaust gas flowing into the upstream side exhaust purification catalyst 20 is alternately and repeatedly set to the lean set air-fuel ratio and the rich set air-fuel ratio. In other words, in the present embodiment, the air-fuel ratio of the exhaust gas flowing into the upstream side exhaust purification catalyst 20 is alternately switched between a rich air-fuel ratio and a lean air-fuel ratio.

<Explanation of Air Fuel Ratio Control Using Time Chart>

Figure 5:
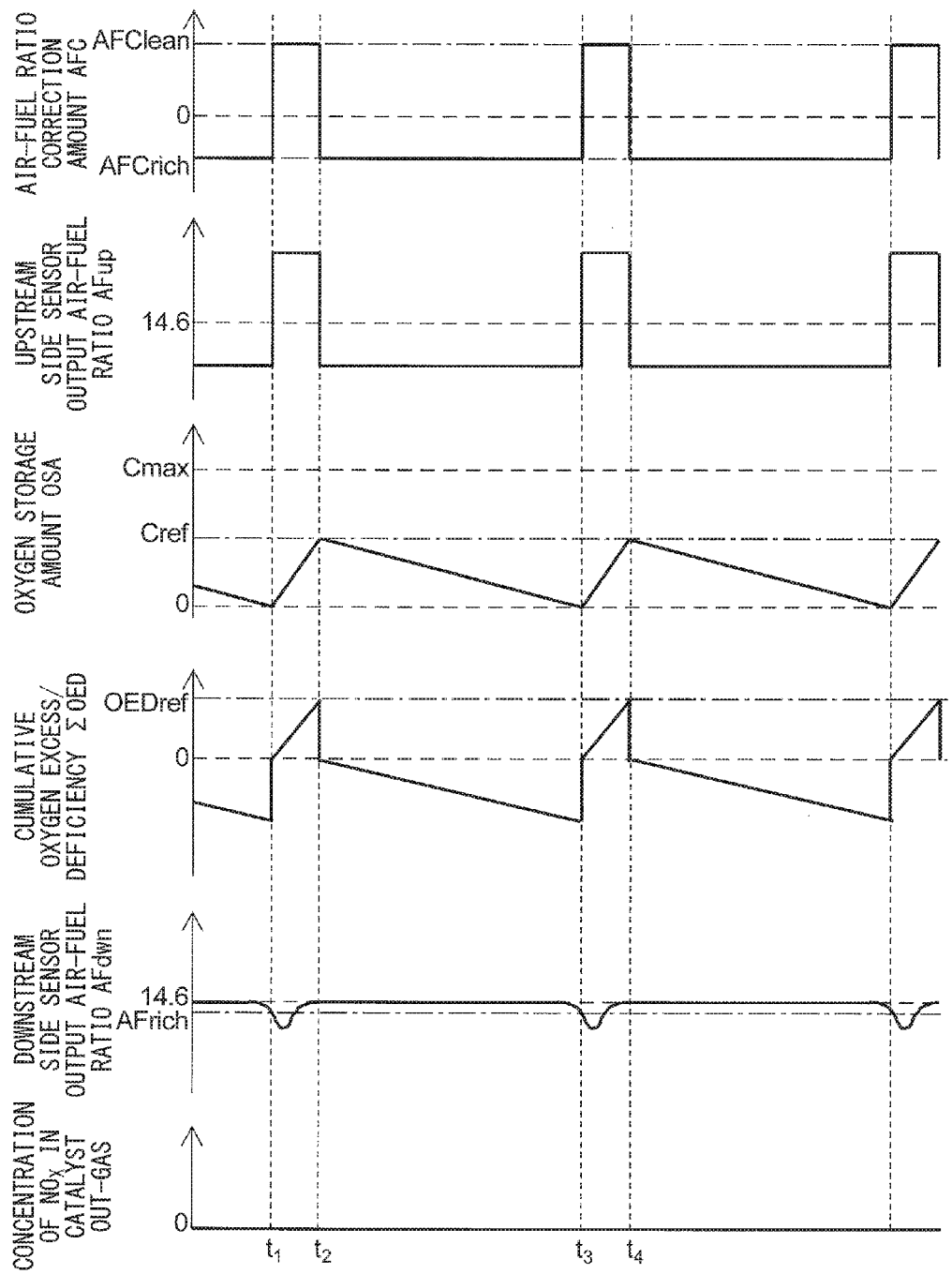
FIG. 5 is a time chart showing a change of an oxygen storage amount of an upstream side exhaust purification catalyst etc. at the time of normal operation of an internal combustion engine.

Referring to FIG. 5, the operation explained as above will be explained in detail. FIG. 5 is a time chart of the air-fuel ratio correction amount AFC, the output air-fuel ratio AFup of the upstream side air-fuel ratio sensor 40, the oxygen storage amount OSA of the upstream side exhaust purification catalyst 20, the cumulative oxygen excess/deficiency ΣOED, the output air-fuel ratio AFdwn of the downstream side air-fuel ratio sensor 41, and the concentration of $NO_x$ in the exhaust gas flowing out from the upstream side exhaust purification catalyst 20, when performing the air-fuel ratio control of the present embodiment.

Note that the air-fuel ratio correction amount AFC is a correction amount relating to the target air-fuel ratio of the exhaust gas flowing into the upstream side exhaust purification catalyst 20. When the air-fuel ratio correction amount AFC is 0, the target air-fuel ratio is set to an air-fuel ratio which is equal to the air-fuel ratio serving as the control center (below, referred to as the "control center air-fuel ratio") (in the present embodiment, the stoichiometric air-fuel ratio). When the air-fuel ratio correction amount AFC is a positive value, the target air-fuel ratio becomes an air-fuel ratio leaner than the control center air-fuel ratio (in the present embodiment, the lean air-fuel ratio), while when the air-fuel ratio correction amount AFC is a negative value, the target air-fuel ratio becomes an air-fuel ratio richer than the control center air-fuel ratio (in the present embodiment, rich air-fuel ratio). Further, the "control center air-fuel ratio" means the air-fuel ratio to which of the air-fuel ratio correction amount AFC is added in accordance with the engine operating state, that is, the air-fuel ratio which is the reference when changing the target air-fuel ratio in accordance with the air-fuel ratio correction amount AFC.

In the example shown in FIG. 5, in the state before the time $t_1$, the air-fuel ratio correction amount AFC is set to the rich set correction amount AFCrich (corresponding to rich set air-fuel ratio). That is, the target air-fuel ratio is set to the rich air-fuel ratio. Along with this, the output air-fuel ratio of the upstream side air-fuel ratio sensor 40 becomes the rich air-fuel ratio. Unburned gas, etc. contained in the exhaust gas flowing into the upstream side exhaust purification catalyst 20 is purified in the upstream side exhaust purification catalyst 20. Along with this, the oxygen storage amount OSA of the upstream side exhaust purification catalyst 20 gradually decreases. Since due to the purification in the upstream side exhaust purification catalyst 20, unburned gas, etc., is not contained in the exhaust gas flowing out from the upstream side exhaust purification catalyst 20, the output air-fuel ratio AFdwn of the downstream side air-fuel ratio sensor 41 is substantially the stoichiometric air-fuel ratio. Since the air-fuel ratio of the exhaust gas flowing into the upstream side exhaust purification catalyst 20 is a rich air-fuel ratio, the NOx discharging amount from the upstream side exhaust purification catalyst 20 is substantially zero.

If the oxygen storage amount OSA of the upstream side exhaust purification catalyst 20 gradually decreases, the oxygen storage amount OSA approaches zero. Along with this, a part of the unburned gas flowing into the upstream side exhaust purification catalyst 20 starts to flow out without being purified by the upstream side exhaust purification catalyst 20. As a result, the output air-fuel ratio AFdown of the downstream side air-fuel ratio sensor 41 gradually falls, and at the time $t_1$, the output air-fuel ratio AFdwn of the downstream side air-fuel ratio sensor 41 reaches the rich judged air-fuel ratio AFrich.

In the present embodiment, if the output air-fuel ratio AFdwn of the downstream side air-fuel ratio sensor 41 becomes the rich judged air-fuel ratio AFrich or less, in order to make the oxygen storage amount OSA increase, the air-fuel ratio correction amount AFC is switched to the lean set correction amount AFClean (corresponding to lean set air-fuel ratio). Further, at this time, the cumulative oxygen excess/deficiency ΣOED is reset to zero.

Note that, in the present embodiment, the air-fuel ratio correction amount AFC is switched when the output air-fuel ratio AFdwn of the downstream side air-fuel ratio sensor 41 reaches the rich judged air-fuel ratio AFrich. This is because even if the oxygen storage amount OSA of the upstream side exhaust purification catalyst 20 is sufficient, sometimes the air-fuel ratio of the exhaust gas flowing out from the upstream side exhaust purification catalyst 20 deviates very slightly from the stoichiometric air-fuel ratio. Conversely speaking, the rich judged air-fuel ratio is set to an air-fuel ratio which the air-fuel ratio of the exhaust gas flowing out from the upstream side exhaust purification catalyst 20 never reaches when the oxygen storage amount of the upstream side exhaust purification catalyst 20 is sufficient.

If switching the target air-fuel ratio to the lean air-fuel ratio at the time $t_1$, the air-fuel ratio of the exhaust gas flowing into the upstream side exhaust purification catalyst 20 changes from the rich air-fuel ratio to the lean air-fuel ratio. If the air-fuel ratio of the exhaust gas flowing into the upstream side exhaust purification catalyst 20 changes to the lean air-fuel ratio at the time $t_1$, the oxygen storage amount OSA of the upstream side exhaust purification catalyst 20 increases. Further, along with this, the cumulative oxygen excess/deficiency ΣOED also gradually increases.

Therefore, the air-fuel ratio of the exhaust gas flowing out from the upstream side exhaust purification catalyst 20 changes to the stoichiometric air-fuel ratio, and the output air-fuel ratio AFdwn of the downstream side air-fuel ratio sensor 41 returns to the stoichiometric air-fuel ratio. At this time, the air-fuel ratio of the exhaust gas flowing into the upstream side exhaust purification catalyst 20 is the lean air-fuel ratio, but there is sufficient leeway in the oxygen storage ability of the upstream side exhaust purification catalyst 20, and therefore the oxygen in the inflowing exhaust gas is stored in the upstream side exhaust purification catalyst 20 and NOx is removed by reduction. Therefore, the exhaust of $NO_x$ from the upstream side exhaust purification catalyst 20 becomes substantially zero.

Then, if the upstream side exhaust purification catalyst 20 increases in the oxygen storage amount OSA, at the time $t_2$, the oxygen storage amount OSA of the upstream side exhaust purification catalyst 20 reaches the switching reference storage amount Cref. Therefore, the cumulative oxygen excess/deficiency ΣOED reaches the switching reference value OEDref which corresponds to the switching reference storage amount Cref. In the present embodiment, if the cumulative oxygen excess/deficiency ΣOED becomes the switching reference value OEDref or more, the storage of oxygen in the upstream side exhaust purification catalyst 20 is suspended by switching the air-fuel ratio correction amount AFC to the rich set correction amount AFCrich. Therefore, the target air-fuel ratio is made the rich air-fuel ratio. Further, at this time, the cumulative oxygen excess/deficiency ΣOED is reset to 0.

Note that the switching reference storage amount Cref is set to an amount sufficiently small so that the oxygen storage amount OSA does not reach the maximum storable oxygen amount Cmax even if unintentional deviation in air-fuel ratio due to abrupt acceleration of the vehicle, etc. occurs.

For example, the switching reference storage amount Cref is made ¾ or less of the maximum storable oxygen amount Cmax before the upstream side exhaust purification catalyst 20 is used, preferably ½ or less thereof, more preferably ⅕ or less thereof. As a result, the air-fuel ratio correction amount AFC is switched to the rich set correction amount AFCrich before the output air-fuel ratio AFdown of the downstream side air-fuel ratio sensor 41 reaches a lean judged air-fuel ratio which is slightly leaner than the stoichiometric air-fuel ratio (for example, 14.65, a lean air-fuel ratio wherein the difference from the stoichiometric air-fuel ratio is almost the same as the difference between the rich judged air-fuel ratio and the stoichiometric air-fuel ratio).

At the time $t_2$, if the target air-fuel ratio is switched to the rich set air-fuel ratio, the air-fuel ratio of the exhaust gas flowing into the upstream side exhaust purification catalyst 20 changes from the lean air-fuel ratio to the rich air-fuel ratio. Since the exhaust gas flowing into the upstream side exhaust purification catalyst 20 contains unburned gas, etc., the upstream side exhaust purification catalyst 20 gradually decreases in oxygen storage amount OSA. At this time, $NO_x$ amount exhausted from the upstream side exhaust purification catalyst 20 is substantially zero.

The oxygen storage amount OSA of the upstream side exhaust purification catalyst 20 gradually decreases, and at the time $t_3$, in a similar way to time $t_1$, the output air-fuel ratio AFdwn of the downstream side air-fuel ratio sensor 41 reaches the rich judged air-fuel ratio AFrich. Due to this, the air-fuel ratio correction amount AFC is switched to the lean set correction amount AFClean. Then, the cycle of the above mentioned times $t_1$ to $t_3$ is repeated.

As will be understood from the above explanation, according to the present embodiment, it is possible to constantly suppress the amount of exhaust of $NO_x$ from the upstream side exhaust purification catalyst 20. That is, so long as performing the above-mentioned control, basically, it is possible to make the amount of exhaust of $NO_x$ from the upstream side exhaust purification catalyst 20 substantially zero. Further, the cumulative time period when calculating the cumulative oxygen excess/deficiency ΣOED is short, therefore compared with the case of cumulatively adding the values over a long time period, error in calculation is kept from occurring. For this reason, it is suppressed that the NOx is exhausted due to an error in calculation of the cumulative oxygen excess/deficiency ΣOED.

Further, in general, if the oxygen storage amount of the exhaust purification catalyst is maintained constant, the oxygen storage ability of the exhaust purification catalyst falls. That is, to maintain the oxygen storage ability of the exhaust purification catalyst high, the oxygen storage amount of the exhaust purification catalyst has to fluctuate. As opposed to this, according to the present embodiment, as shown in FIG. 5, the oxygen storage amount OSA of the upstream side exhaust purification catalyst 20 constantly fluctuates up and down, therefore the oxygen storage ability is kept from falling.

Note that, in the above embodiment, during the times $t_1$ to $t_2$, the air-fuel ratio correction amount AFC is maintained at the lean set correction amount AFClean. However, during this time period, the air-fuel ratio correction amount AFC does not necessarily have to be maintained constant. It may be set to fluctuate, such as to gradually decrease. Alternatively, in the time period of the times $t_1$ to $t_2$, it is also possible to temporarily set the air-fuel ratio correction amount AFC to a value smaller than 0 (for example, the rich set correction amount, etc.).

Similarly, in the above embodiment, during the times $t_2$ to $t_3$, the air-fuel ratio correction amount AFC is maintained at the rich set correction amount AFCrich. However, during this time period, the air-fuel ratio correction amount AFC does not necessarily have to be maintained constant. It may be set to fluctuate, such as to gradually increase. Alternatively, in the time period of the times $t_2$ to $t_3$, it is also possible to temporarily set the air-fuel ratio correction amount AFC to a value larger than 0 (for example, the lean set correction amount, etc.).

Note that, in the present embodiment, the air-fuel ratio correction amount AFC is set, that is, the target air-fuel ratio is set, by the ECU 31. Therefore, the ECU 31 can be said to continuously or intermittently make the target air-fuel ratio of the exhaust gas flowing into the upstream side exhaust purification catalyst 20 a lean air-fuel ratio until the oxygen storage amount OSA of the upstream side exhaust purification catalyst 20 is estimated to have become the switching reference storage amount Cref or more when the air-fuel ratio of the exhaust gas detected by the downstream side air-fuel ratio sensor 41 becomes the rich judged air-fuel ratio or less, and to continuously or intermittently make the target air-fuel ratio a rich air-fuel ratio until the air-fuel ratio of the exhaust gas detected by of the downstream side air-fuel ratio sensor 41 becomes a rich judged air-fuel ratio or less without the oxygen storage amount OSA reaching the maximum storable oxygen amount Cmax when the oxygen storage amount OSA of the upstream side exhaust purification catalyst 20 is estimated to have become the switching reference storage amount Cref or more.

More simply speaking, in the present embodiment, the ECU 31 can be said to switch the target air-fuel ratio (that is, the air-fuel ratio of the exhaust gas flowing into the upstream side exhaust purification catalyst 20) to the lean air-fuel ratio when the air-fuel ratio detected by of the downstream side air-fuel ratio sensor 41 becomes the rich judged air-fuel ratio or less, and to switch the target air-fuel ratio (that is, the air-fuel ratio of the exhaust gas flowing into the upstream side exhaust purification catalyst 20) to the rich air-fuel ratio when the oxygen storage amount OSA of the upstream side exhaust purification catalyst 20 becomes the switching reference storage amount Cref or more.

<Cracked Element of Air-Fuel Ratio Sensor>

Figure 6:
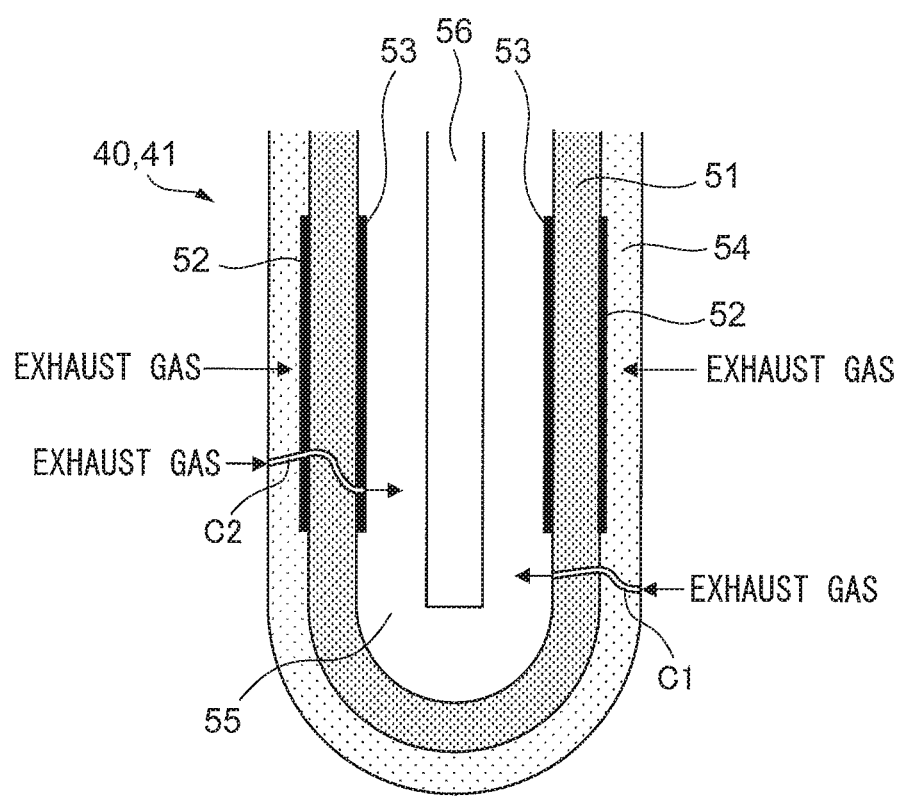
FIG. 6 is a schematic cross-sectional view of an air-fuel ratio sensor suffering from a cracked element.

In this regard, as an abnormality which occurs at the above-mentioned such air-fuel ratio sensors 40, 41, cracking of the element forming the air-fuel ratio sensor 40 or 41, that is, the phenomenon referred to as a "cracked element", may be mentioned. Specifically, a crack which passes through the solid electrolyte layer 51 and diffusion regulating layer 54 (C1 of FIG. 6) or a crack which passes through the solid electrolyte layer 51 and diffusion regulating layer 54 plus the two electrodes 52, 53 (C2 of FIG. 6) sometimes occurs. If such a cracked element occurs, as shown in FIG. 6, exhaust gas enters into the reference gas chamber 55 through the cracked part.

As a result, when the air-fuel ratio of the exhaust gas around the air-fuel ratio sensors 40, 41 is the rich air-fuel ratio, exhaust gas of the rich air-fuel ratio enters the reference gas chamber 55. Due to this, in the reference gas chamber 55, the rich air-fuel ratio exhaust gas diffuses and the oxygen concentration around the atmosphere side electrode 53 falls. On the other hand, in this case as well, the exhaust side electrode 52 is exposed through the diffusion regulating layer 54 to the exhaust gas. For this reason, the difference in oxygen concentration between the surroundings of the atmosphere side electrode 53 and the surroundings of the exhaust side electrode 52 falls and as a result the output air-fuel ratios of the air-fuel ratio sensors 40, 41 become lean air-fuel ratios. That is, if an air-fuel ratio sensor 40 or 41 suffers from a cracked element, even if the air-fuel ratio of the exhaust gas around the air-fuel ratio sensor 40 or 41 is a rich air-fuel ratio, the output air-fuel ratio of the air-fuel ratio sensor 40 or 41 ends up becoming a lean air-fuel ratio.

On the other hand, if the air-fuel ratio of the exhaust gas around the air-fuel ratio sensors 40, 41 is a lean air-fuel ratio, such a reversal phenomenon of an output air-fuel ratio does not occur. This is because if the air-fuel ratio of the exhaust gas is a lean air-fuel ratio, the output current of each air-fuel ratio sensor 40 or 41 depends on the amount of oxygen which reaches the surface of the exhaust side electrode 52 through the diffusion regulating layer 54 rather than the difference of air-fuel ratios of the two sides of the solid electrolyte layer 51.

If, in this way, the air-fuel ratio sensor 40 or 41 suffers from a cracked element, when the air-fuel ratio of the exhaust gas around the air-fuel ratio sensor 40 or 41 is the rich air-fuel ratio, a mistaken output ends up being generated. For this reason, for example, if the downstream side air-fuel ratio sensor 41 suffers from a cracked element, when the above-mentioned air-fuel ratio control is performed, the air-fuel ratio control can no longer be suitably performed. For this reason, it becomes necessary to quickly diagnose that the downstream side air-fuel ratio sensor 41 has suffered from a cracked element.

<Diagnosis of Abnormality>

Therefore, the present embodiment utilizes the above-mentioned property of the abnormality of a cracked element of the downstream side air-fuel ratio sensor 41 to diagnose abnormality due to the cracked element of the downstream side air-fuel ratio sensor 41. Specifically, in the control for diagnosis of abnormality, when, due to the above-mentioned air-fuel ratio control, the air-fuel ratio of the exhaust gas flowing into the upstream side exhaust purification catalyst 20 is made the rich air-fuel ratio, it is judged that the downstream side air-fuel ratio sensor 41 has become abnormal when the output air-fuel ratio of the downstream side air-fuel ratio sensor 41 changes from an air-fuel ratio richer than the lean judged air-fuel ratio to a lean air-fuel ratio than the lean judged air-fuel ratio.

In addition, in the present embodiment, if, due to control for diagnosis of abnormality, it is judged that the downstream side air-fuel ratio sensor 41 has become abnormal, the absolute value of the rich set correction amount is made smaller, that is, the rich degree of the rich set air-fuel ratio is made smaller. In addition, in the present embodiment, if it is judged that the downstream side air-fuel ratio sensor 41 has become abnormal, the absolute value of the lean set correction amount is made smaller, that is, the lean degree of the lean set air-fuel ratio is made smaller. This situation will be explained referring to FIG. 7.

Figure 7:
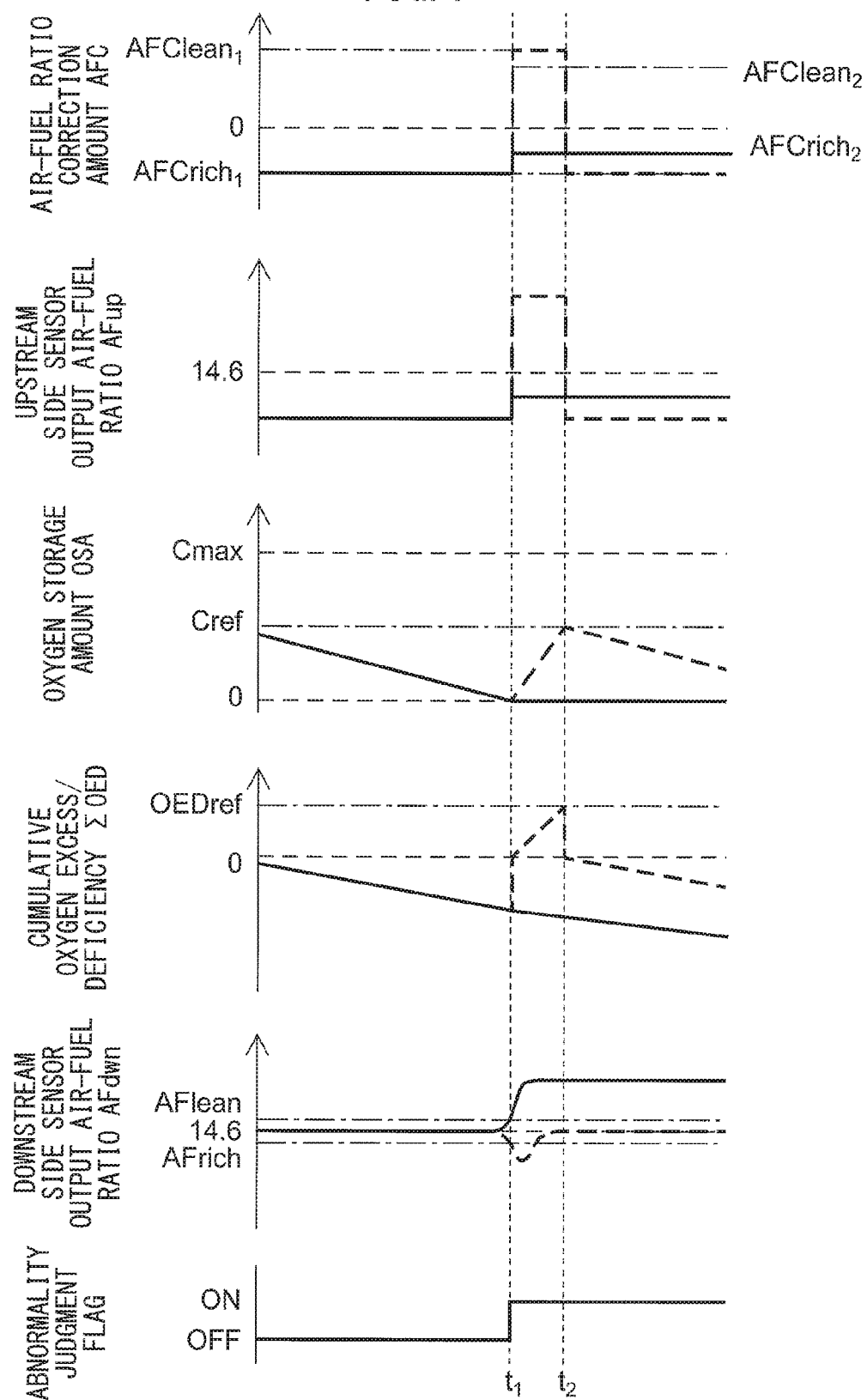
FIG. 7 is a time chart of an air-fuel ratio correction amount etc.

FIG. 7 is a time chart of an air-fuel ratio correction amount AFC, output air-fuel ratio AFup of the upstream side air-fuel ratio sensor 40, oxygen storage amount OSA of the upstream side exhaust purification catalyst 20, cumulative oxygen excess/deficiency ΣOED, and output air-fuel ratio AFdwn of the downstream side air-fuel ratio sensor 41. The broken line in the figure shows the trend when the downstream side air-fuel ratio sensor 41 does not suffer from the abnormality of a cracked element, while the solid line in the figure shows the trend when the downstream side air-fuel ratio sensor 41 suffers from the abnormality of a cracked element.

In the example shown in FIG. 7, before the time $t_1$, the air-fuel ratio correction amount AFC is set to the rich set correction amount AFCrich, so the output air-fuel ratio AFup of the upstream side air-fuel ratio sensor 40 becomes the rich air-fuel ratio. In particular, the rich set correction amount AFCrich at this time is made the first rich set correction amount AFCrich$_1$. Along with this, the oxygen storage amount OSA of the upstream side exhaust purification catalyst 20 gradually decreases and approaches zero. Due to this, part of the unburned gas etc. flowing into the upstream side exhaust purification catalyst 20 starts to flow out without being removed by the upstream side exhaust purification catalyst 20.

If unburned gas etc. start to flow out from the upstream side exhaust purification catalyst 20, when the downstream side air-fuel ratio sensor 41 does not suffer from the abnormality of a cracked element, as shown by the broken line in the figure, at the time $t_1$, the output air-fuel ratio AFdwn of the downstream side air-fuel ratio sensor 41 becomes the rich air-fuel ratio. However, when the downstream side air-fuel ratio sensor 41 suffers from the abnormality of a cracked element, as shown by the solid line in the figure, at the time $t_1$, the output air-fuel ratio AFdwn of the downstream side air-fuel ratio sensor 41 changes from substantially the stoichiometric air-fuel ratio to the lean air-fuel ratio.

That is, if the downstream side air-fuel ratio sensor 41 suffers from the abnormality of a cracked element, when the air-fuel ratio correction amount AFC is set to the rich set correction amount AFCrich, that is, when the air-fuel ratio correction amount AFC is set to a negative value, the output air-fuel ratio AFdwn of the downstream side air-fuel ratio sensor 41 changes from less than the lean judged air-fuel ratio AFlean to the lean judged air-fuel ratio AFlean or more. In the present embodiment, at the time $t_1$ when such a change of the output air-fuel ratio AFdwn of the downstream side air-fuel ratio sensor 41 occurs, it is judged that downstream side air-fuel ratio sensor 41 suffers from the abnormality of a cracked element. Due to this, in the present embodiment, it is possible to accurately diagnosis the abnormality of a cracked element of the downstream side air-fuel ratio sensor 41.

In the example shown in FIG. 7, at the time $t_1$, the abnormality diagnosis flag, which is set to ON when the downstream side air-fuel ratio sensor 41 has become abnormal, is set to ON. In addition, in the present embodiment, when in this way it is judged the downstream side air-fuel ratio sensor 41 suffers from the abnormality of a cracked element, for example, a warning light of the vehicle mounting the internal combustion engine is turned on.

Further, when, at the time $t_1$, it is judged that the downstream side air-fuel ratio sensor 41 suffers from the abnormality of a cracked element, the absolute value of the rich set correction amount AFCrich and the absolute value of the lean set correction amount AFClean are made to decrease. In the example shown in FIG. 7, the rich set correction amount AFCrich is changed from the first rich set correction amount AFCrich$_1$ to a second rich set correction amount AFCrich$_2$ with a smaller absolute value than the first rich set correction amount AFCrich$_1$ (|AFCrich$_1$|>|AFCrich$_2$|). Further, the lean set correction amount AFClean is changed from the first lean set correction amount AFClean$_1$ to a second lean set correction amount AFClean$_2$ with a smaller absolute value than the first lean set correction amount AFClean$_1$ (|AFClean$_1$|>|AFClean$_2$|). Therefore, the rich degree of the rich set air-fuel ratio and the lean degree of the lean set air-fuel ratio are made to decrease.

Due to this, at the time $t_1$ on, the rich degree of the exhaust gas flowing out from the upstream side exhaust purification catalyst 20 falls and the rich degree of the output air-fuel ratio of the upstream side air-fuel ratio sensor 40 falls. For this reason, the concentration of unburned gas etc. in the exhaust gas flowing out from the upstream side exhaust purification catalyst 20 falls and therefore deterioration of exhaust emission can be suppressed. Note that, in the present embodiment, both the absolute value of the rich set correction amount AFCrich and the absolute value of the lean set correction amount AFClean are made to decrease. However, it is not necessary to make both decrease. It is also possible to make only the absolute value of the rich set correction amount AFCrich decrease.

In the example shown by the solid line in FIG. 7, even after it is judged that the downstream side air-fuel ratio sensor 41 suffers from the abnormality of a cracked element, the above-mentioned air-fuel ratio control is continued as it is. For this reason, as explained above, the air-fuel ratio correction amount AFC is switched from the rich set correction amount AFCrich to the lean set correction amount AFClean when the output air-fuel ratio AFdwn of the downstream side air-fuel ratio sensor 41 becomes the rich judged air-fuel ratio AFrich or less. For this reason, at the time $t_1$, the air-fuel ratio correction amount AFC is not switched to the lean set correction amount AFClean but is maintained at the rich set correction amount AFCrich as is. For this reason, the oxygen storage amount OSA of the upstream side exhaust purification catalyst 20 is maintained at substantially zero as is.

Note that, in the above-mentioned embodiment, if it is judged once that the downstream side air-fuel ratio sensor 41 suffers from the abnormality of a cracked element, a warning light of the vehicle is turned on. However, to raise the precision of judgment, it is also possible to turn on the warning light of the vehicle when the number of times it is judged that the downstream side air-fuel ratio sensor 41 suffers from the abnormality of a cracked element in a certain time period is a predetermined number of times or more. Alternatively, if defining the time period for setting the air-fuel ratio correction amount AFC to the rich set correction amount AFCrich and the lean set correction amount AFClean one time each as "1 cycle", it is possible to turn on a warning light of the vehicle when the ratio of the number of times it is judged that the downstream side air-fuel ratio sensor 41 suffers from the abnormality of a cracked element with respect to the number of such cycles is a predetermined ratio Ra (0<Ra<1) or more.

In the same way, in the above-mentioned embodiment, if it is judged that the downstream side air-fuel ratio sensor 41 suffers from the abnormality of a cracked element one time, the absolute value of the rich set correction amount AFCrich and the absolute value of the lean set correction amount AFClean are made to decrease. However, to avoid inadvertent change of the set correction amounts, it is also possible to make the absolute values of the set correction amounts decrease when the number of times it was judged that the downstream side air-fuel ratio sensor 41 suffers from the abnormality of a cracked element is a predetermined number of times or more within a certain time period. Alternatively, it is also possible to make the absolute values of the set correction amounts decrease when the ratio of the number of times it was judged that the downstream side air-fuel ratio sensor becomes abnormal to the number of times of the above cycle is the predetermined ratio Ra (0<Ra<1) or more.

Note that, in the above embodiment, in the air-fuel ratio control, when the air-fuel ratio detected by the downstream side air-fuel ratio sensor 41 has become the rich judged air-fuel ratio or less, the target air-fuel ratio is switched to the lean air-fuel ratio. Further, when the cumulative oxygen excess/deficiency ΣOED becomes a predetermined switching reference value OEDref or more, the target air-fuel ratio is switched to the rich air-fuel ratio. However, as the air-fuel ratio control, another control may also be used. As such another control, for example, control may be considered where when the output air-fuel ratio of the downstream side air-fuel ratio sensor 41 becomes the lean judged air-fuel ratio or more, the target air-fuel ratio is switched to the rich air-fuel ratio, while when the output air-fuel ratio of the downstream side air-fuel ratio sensor 41 becomes the rich judged air-fuel ratio or less, the target air-fuel ratio is switched to lean air-fuel ratio. Even in the case of performing such control, in the same way, the downstream side air-fuel ratio sensor 41 can be diagnosed for the abnormality of a cracked element.

<Explanation of Specific Control>

Next, referring to FIGS. 8 to 11, the control device in the present embodiment will be specifically explained.

Figure 8:
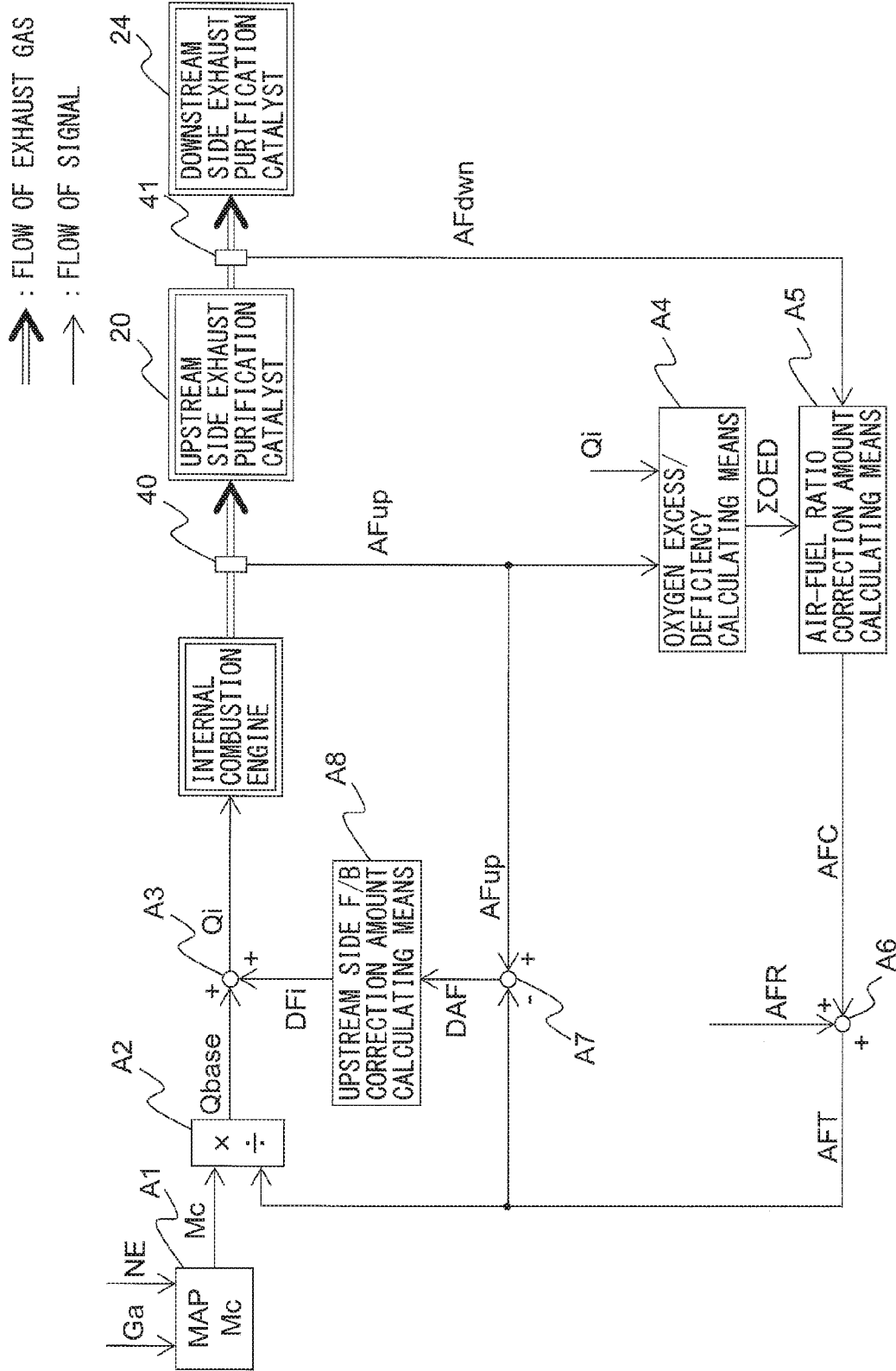
FIG. 8 is a functional block diagram of a control device.

The control device in the present embodiment is configured so as to include the functional blocks A1 to A8, as shown in the block diagram of FIG. 8. Below, while referring to FIG. 8, the functional blocks will be explained. The operations of these functional blocks A1 to A8 are basically executed by the ECU 31.

<Calculation of Fuel Injection Amount>

First, calculation of the fuel injection amount will be explained. In calculating the fuel injection amount, the cylinder intake air calculating means A1, basic fuel injection calculating means A2, and fuel injection calculating means A3 are used.

The cylinder intake air calculating means A1 calculates the intake air amount Mc to each cylinder based on the intake air flow rate Ga, engine speed NE, and map or calculation formula which is stored in the ROM 34 of the ECU 31. The intake air flow rate Ga is measured by the air flow meter 39, and the engine speed NE is calculated based on the output of the crank angle sensor 44.

The basic fuel injection calculating means A2 divides the cylinder intake air amount Mc calculated by the intake air calculating means A1, by the target air-fuel ratio AFT to calculate the basic fuel injection amount Qbase (Qbase=Mc/AFT). The target air-fuel ratio AFT is calculated by the later explained target air-fuel ratio setting means A6.

The fuel injection calculating means A3 adds the later explained F/B correction amount DFi to the basic fuel injection amount Qbase which was calculated by the basic fuel injection calculating means A2, to calculate the fuel injection amount Qi (Qi=Qbase+DFi). An injection is instructed to the fuel injector 11 so that fuel of the thus calculated fuel injection amount Qi is injected from the fuel injector 11.

<Calculation of Target Air Fuel Ratio>

Next, calculation of the target air-fuel ratio will be explained. In calculating the target air-fuel ratio, oxygen excess/deficiency calculating means A4, air-fuel ratio correction amount calculating means A5 and learning value calculating means A6 are used.

The oxygen excess/deficiency calculating means A4 calculates the cumulative oxygen excess/deficiency ΣOED, based on the fuel injection amount Qi calculated by the fuel injection calculating means A3 and the output air-fuel ration AFup of the upstream side air-fuel ratio sensor 40. For example, the oxygen excess/deficiency calculating means A4 calculates the cumulative oxygen excess/deficiency ΣOED, by multiplying the deference between the output air-fuel ratio of the upstream side air-fuel ratio and the control center air-fuel ratio by the fuel injection amount Qi, and by cumulatively adding the products.

The air-fuel ratio correction amount calculating means A5 calculates the air-fuel ratio correction amount AFC, based on the cumulative oxygen excess/deficiency ΣOED calculated by the oxygen excess/deficiency calculating means A4 and the output air-fuel ratio AFdwn of the downstream side air-fuel ratio sensor 41. Specifically, the air-fuel ratio correction amount AFC of the target air-fuel ratio is calculated based on the flow chart shown in FIG. 9.

The target air-fuel ratio setting means A6 adds the air-fuel ratio correction amount AFC which was calculated by the air-fuel ratio correction amount calculating means A5, to the control center air-fuel ratio AFR (in the present embodiment, a stoichiometric air-fuel ratio) to calculate the target air-fuel ratio AFT. The thus calculated target air-fuel ratio AFT is input to the basic fuel injection calculating means A2 and later explained air-fuel ratio deviation calculating means A7.

<Calculation of F/B Correction Amount>

Next, calculation of the F/B correction amount based on the output air-fuel ratio AFup of the upstream side air-fuel ratio sensor 40 will be explained. In calculating the F/B correction amount, air-fuel ratio deviation calculating means A7 and F/B correction calculating means A8 are used.

The air-fuel ratio deviation calculating means A7 subtracts the target air-fuel ratio AFT which was calculated by the target air-fuel ratio setting means A6 from the output air-fuel ratio AFup of the upstream side air-fuel ratio sensor 40 to calculate the air-fuel ratio deviation DAF (DAF=AFup−AFT). This air-fuel ratio deviation DAF is a value which expresses the excess/deficiency of the amount of fuel feed to the target air-fuel ratio AFT.

The F/B correction calculating means A8 processes the air-fuel ratio deviation DAF which was calculated by the air-fuel ratio deviation calculating means A7 by proportional integral derivative processing (PID processing) to calculate the F/B correction amount DFi for compensating for the excess/deficiency of the fuel feed amount based on the following formula (2). The thus calculated F/B correction amount DFi is input to the fuel injection calculating means A3.

$$DFi = Kp \cdot DAF + Ki \cdot SDAF + Kd \cdot DDAF \qquad (2)$$

Note that, in the above formula (2), Kp is a preset proportional gain (proportional constant), Ki is a preset integral gain (integral constant), and Kd is a preset derivative gain (derivative constant). Further, DDAF is the time derivative of the air-fuel ratio deviation DAF and is calculated by dividing the difference between the currently updated air-fuel ratio deviation DAF and the previously updated air-fuel ratio deviation DAF by a time corresponding to the updating interval. Further, SDAF is the time integral of the air-fuel ratio deviation DAF. This time integral SDAF is calculated by adding the currently updated air-fuel ratio deviation DAF to the previously updated time integral SDAF (SDAF=SDAF+DAF).

<Flow Chart of Control for Setting Air-Fuel Ratio Correction Amount>

Figure 9:
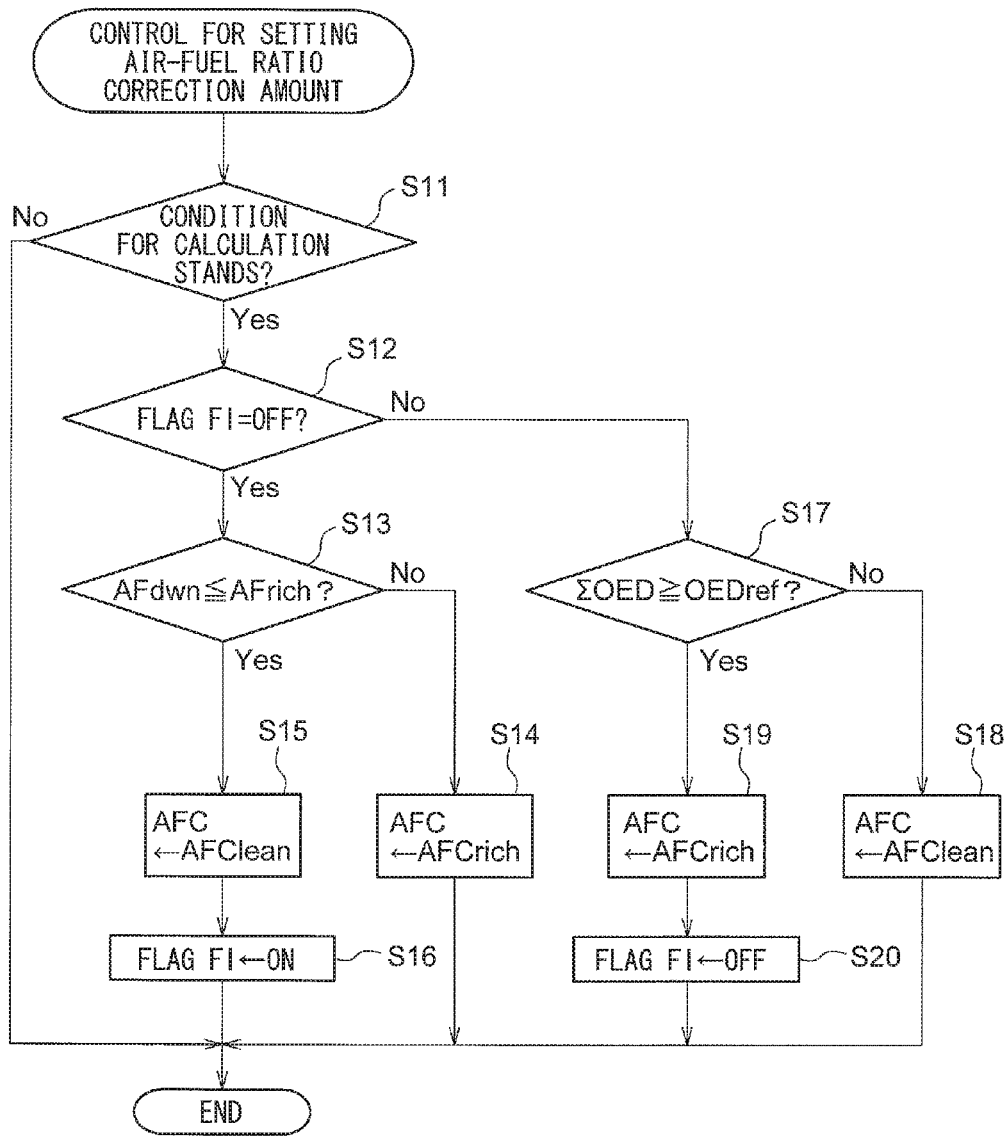
FIG. 9 is a flow chart showing a control routine of control for setting an air-fuel ratio correction amount.

FIG. 9 is a flow chart showing the control routine of control for setting the air-fuel ratio correction amount. The control routine shown in the figure is performed by interruption every certain time interval. As shown in FIG. 9, first, at step S11, it is judged if the condition for calculation of the air-fuel ratio correction amount AFC stands. The case where the condition for calculation of the air-fuel ratio correction amount AFC stands is, for example, in the case where normal operation, in which a feedback control is performed, is performed, such as in the case where fuel cut control is not performed. When it is judged at step S11 that the condition for calculation of the air-fuel ratio correction amount AFC stands, the routine proceeds to step S12.

Next, at step S12, it is judged if the lean set flag F1 is set to "OFF". The lean set flag F1 is a flag which is set to "ON" when the air-fuel ratio correction amount AFC is set to the lean set correction amount AFClean, and is set to "OFF" otherwise. When it is judged at step S12 that the lean set flag F1 is set to "OFF", the routine proceeds to step S13. At step S13, it is judged if the output air-fuel ratio AFdwn of the downstream side air-fuel ratio sensor 41 is the rich judged air-fuel ratio AFrich or less. If it is judged that the output air-fuel ratio AFdwn of the downstream side air-fuel ratio sensor 41 is larger than the rich judged air-fuel ratio AFrich, the routine proceeds to step 14. At step S14, the air-fuel correction amount AFC is maintained to the rich set correction amount AFCrich, and the control routine is ended.

On the other hand, if the oxygen storage amount OSA of the upstream side exhaust purification catalyst 20 decrease and thus the air-fuel ratio of the exhaust gas flowing out from the upstream side exhaust purification catalyst 20 falls, it is judged that the output air-fuel ratio AFdwn of the downstream side air-fuel ratio sensor 41 is the rich judged air-fuel ratio AFrich or less at step S13. In this case, the routine proceeds to step S15, and the air-fuel ratio correction amount AFC is switched to the lean set correction amount AFClean. Next, at step S16, the lean set flag F1 is set to "ON", then the control routine is ended.

If the lean set flag F1 is set to "ON", in the next control routine, at step S12, it is judged that the lean set flag F1 is not set to "OFF", and thus the routine proceeds to step S17. In step S17, it is judged if the cumulative oxygen excess/deficiency ΣOED from the time when the air-fuel ratio correction amount AFC was switched to the lean set correction amount AFClean is lower than the switching reference value OEDref. If it is judged that the cumulative oxygen excess/deficiency ΣOED is lower than the witching reference value OEDref, the routine proceeds to step S18, and the air-fuel ratio correction amount AFC is continuously set to the lean set correction amount AFClean and is maintained. Then, the control routine is ended. On the other hand, if the oxygen storage amount of the upstream side exhaust purification catalyst 20 increases, finally, it is judged at step S17 that the cumulative oxygen excess/deficiency ΣOED is equal to or greater than the switching reference value OEDref, and thus the routine proceeds to step S19. At step S19, the air-fuel ratio correction amount AFC is switched to the rich set correction amount AFCrich. Next, at step S20, the lean set flag F1 is reset to "OFF", and then the control routine is ended.

<Flow Chart of Control for Diagnosing Abnormality>

Figure 10:
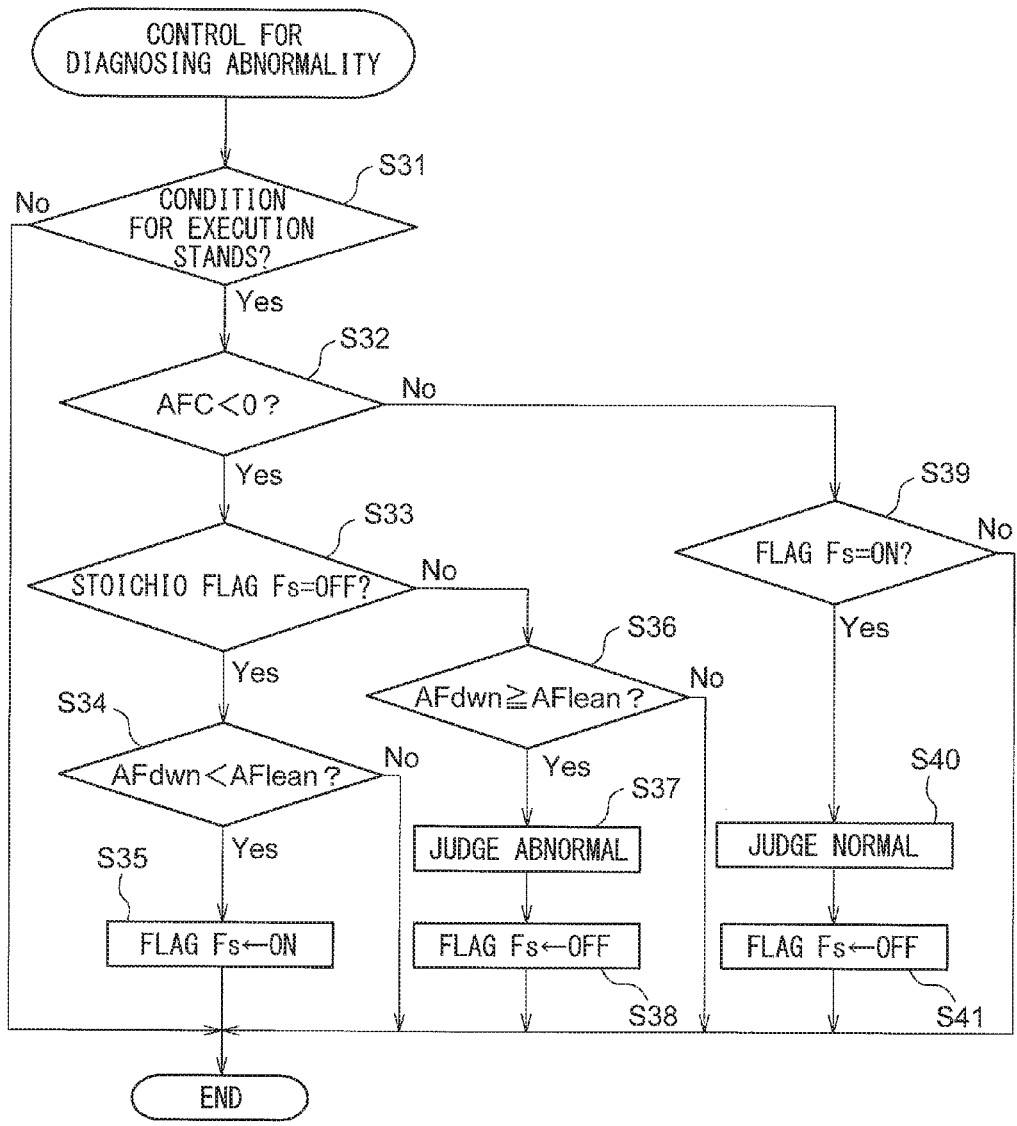
FIG. 10 is a flow chart showing a control routine of control for diagnosing abnormality which diagnoses a downstream side air-fuel ratio sensor for abnormality.

FIG. 10 is a flow chart showing a control routine of abnormality diagnosis control for diagnosing the downstream side air-fuel ratio sensor 41 for abnormality. The illustrated control routine is performed by interruption at constant time intervals.

As shown in FIG. 10, first, at step S31, it is judged if the condition for diagnosing abnormality stands. The case where the condition for diagnosing abnormality stands is, for example, when the above-mentioned air-fuel ratio control is being performed etc. When, at step S31, it is judged that the condition for diagnosing abnormality stands, the routine proceeds to step S32.

At step S32, it is judged if the air-fuel ratio correction amount AFC was set to less than 0 in the above-mentioned control for setting the air-fuel ratio correction amount, that is, if the target air-fuel ratio is the rich air-fuel ratio. If, at step S32, it is judged that the air-fuel ratio correction amount AFC is set to less than 0, that is, if it is judged that the target air-fuel ratio is the rich air-fuel ratio, the routine proceeds to step S33.

At step S33, it is judged if the stoichiometric flag Fs has been set to OFF. The stoichiometric flag Fs is a flag which is set to ON when the air-fuel ratio correction amount AFC is set to the rich set correction amount AFCrich and the output air-fuel ratio AFdwn of the downstream side air-fuel ratio sensor 41 becomes an air-fuel ratio smaller than the lean judged air-fuel ratio AFlean and near the stoichiometric air-fuel ratio and which is otherwise set to OFF. When, at step S33, the stoichiometric flag Fs is set to OFF, the routine proceeds to step S34.

At step S34, it is judged if the output air-fuel ratio AFdwn of the downstream side air-fuel ratio sensor 41 is less than the lean judged air-fuel ratio AFlean. Right after the air-fuel ratio correction amount AFC is switched to the rich set correction amount AFCrich, the air-fuel ratio of the exhaust gas flowing out from the upstream side exhaust purification catalyst 20 becomes substantially the stoichiometric air-fuel ratio, so, at step S34, it is judged that the output air-fuel ratio AFdwn of the downstream side air-fuel ratio sensor 41 is less than the lean judged air-fuel ratio AFlean, and the routine proceeds to step S35. At step S35, the stoichiometric flag Fs is set to ON, and the control routine is made to end.

If the stoichiometric flag Fs is set to ON, at the next control routine, the routine proceeds from step S33 to step S36. At step S36, it is judged if the output air-fuel ratio AFdwn of the downstream side air-fuel ratio sensor 41 has become the lean judged air-fuel ratio AFlean or more, that is, if the output air-fuel ratio AFdwn has changed from an air-fuel ratio lower than the lean judged air-fuel ratio AFlean to the lean judged air-fuel ratio AFlean or more. If it is judged that the output air-fuel ratio AFdwn of the downstream side air-fuel ratio sensor 41 has not become the lean judged air-fuel ratio AFlean or more, the control routine is made to end. On the other hand, if, at step S36, it is judged that the output air-fuel ratio AFdwn of the downstream side air-fuel ratio sensor 41 has become the lean judged air-fuel ratio AFlean or more, the routine proceeds to step S37. At step S37, it is judged that the downstream side air-fuel ratio sensor 41 is abnormal, and the routine proceeds to step S38. At step S38, the stoichiometric flag Fs is set to OFF, and the control routine is made to end.

On the other hand, if, at step S32, it is judged that the air-fuel ratio correction amount AFC has been set to 0 or more, that is, if it is judged that the target air-fuel ratio is the lean air-fuel ratio, the routine proceeds to step S39. At step S39, it is judged if the stoichiometric flag Fs has become ON. If the target air-fuel ratio had been set to the rich air-fuel ratio before being set to the lean air-fuel ratio and, at step S35, the stoichiometric flag Fs had been set to ON, the routine proceeds to step S40. In this case, when the target air-fuel ratio had been set to the rich air-fuel ratio the previous time, it means that the output air-fuel ratio AFdwn of the downstream side air-fuel ratio sensor 41 has not become the lean judged air-fuel ratio AFlean or more. For this reason, at step S40, it is judged that the downstream side air-fuel ratio sensor 41 is normal. Next, at step S41, the stoichiometric flag Fs is reset to OFF, and the control routine is made to end. If the stoichiometric flag Fs is reset to OFF, at the next control routine, at step S39, it is judged that the stoichiometric flag Fs has not become ON, and the control routine is made to end.

<Flow Chart of Control for Changing Set Air-Fuel Ratio>

Figure 11:
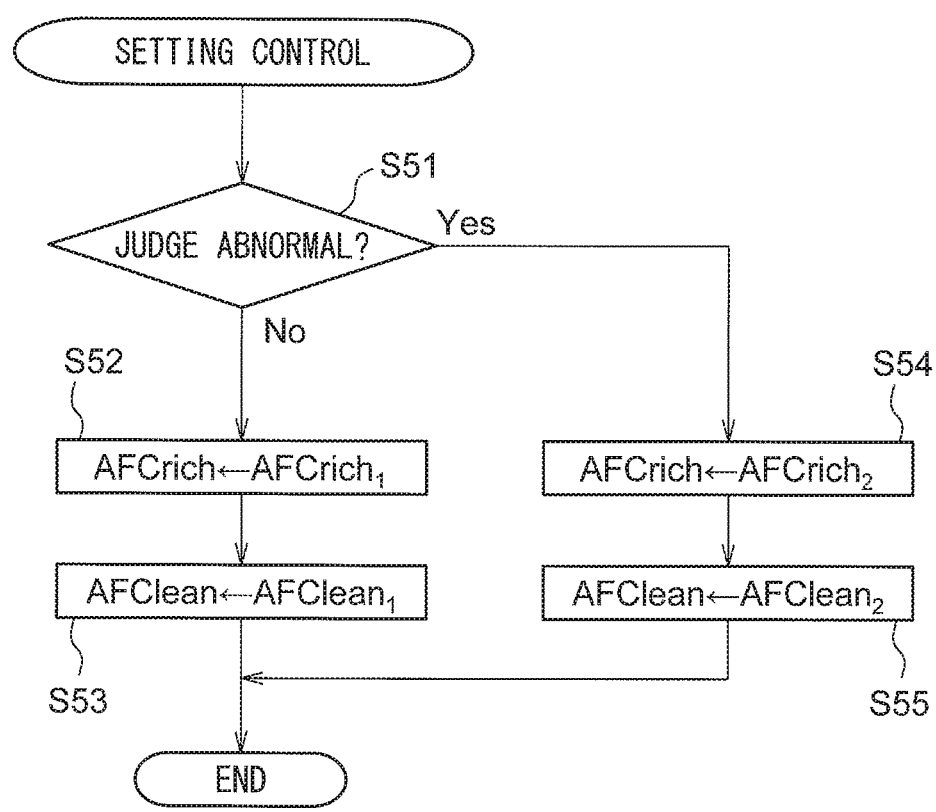
FIG. 11 is a flow chart showing a control routine in control for setting a rich set air-fuel ratio and lean set air-fuel ratio.

FIG. 11 is a flow chart showing a control routine in control for setting a rich set air-fuel ratio and a lean set air-fuel ratio. The illustrated control routine is performed by interruption at constant time intervals.

First, at step S51, it is judged if it was judged at step S37 of FIG. 10 that the downstream side air-fuel ratio sensor 41 was abnormal. When it was judged that it was not judged at step S37 that the downstream side air-fuel ratio sensor 41 was abnormal, the routine proceeds to step S52. At step S52, the rich set correction amount AFCrich is set to the first rich set correction amount $AFCrich_1$. Therefore, at steps S14 and S19 of the flow chart shown in FIG. 9, the air-fuel ratio correction amount AFC is set to the first rich set correction amount $AFCrich_1$.

Next, at step S53, the lean set correction amount AFClean is set to the first lean set correction amount $AFClean_1$. Therefore, at steps S15 and S18 of the flow chart shown in FIG. 9, the air-fuel ratio correction amount AFC is set to the first lean set correction amount $AFClean_1$.

On the other hand, if, at step S51, it is judged that it was judged that the downstream side air-fuel ratio sensor 41 was abnormal, the routine proceeds to step S54. At step S54, the rich set correction amount AFCrich is set to the second rich set correction amount $AFCrich_2$ ($|AFCrich_2|<|AFCrich_1|$). Therefore, at steps S14 and S19 of the flow chart shown in FIG. 9, the air-fuel ratio correction amount AFC is set to the second rich set correction amount $AFCrich_2$.

Next, at step S55, the lean set correction amount AFClean is set to the second lean set correction amount $AFClean_2$ ($|AFClean_2|<|AFClean_1|$). Therefore, at steps S15 and S18 of the flow chart shown in FIG. 9, the air-fuel ratio correction amount AFC is set to the second lean set correction amount $AFClean_2$.

Second Embodiment

Next, referring to FIG. 12 to FIG. 18, an exhaust purification system according to a second embodiment of the present invention will be explained. The configuration and control of the exhaust purification system according to the second embodiment are basically similar to the configuration and control of the exhaust purification system according to the first embodiment.

<Deviation at Upstream Side Air Fuel Ratio Sensor>

When the engine body 1 has a plurality of cylinders, sometimes a deviation occurs between the cylinders in the air-fuel ratio of the exhaust gas which is exhausted from the cylinders. On the other hand, the upstream side air-fuel ratio sensor 40 is arranged at the header of the exhaust manifold 19, but depending on the position of arrangement, the extent by which the exhaust gas exhausted from each cylinder is exposed to the upstream side air-fuel ratio sensor 40 differs between cylinders. As a result, the output air-fuel ratio of the upstream side air-fuel ratio sensor 40 is strongly affected by the air-fuel ratio of the exhaust gas which is exhausted from a certain specific cylinder. Therefore, when the air-fuel ratio of the exhaust gas which is exhausted from a certain specific cylinder becomes an air-fuel ratio which differs from the average air-fuel ratio of the exhaust gas which is exhausted from all cylinders, deviation occurs between the average air-fuel ratio and the output air-fuel ratio of the upstream side air-fuel ratio sensor 40. That is, the output air-fuel ratio of the upstream side air-fuel ratio sensor 40 deviates to the rich side or lean side from the actual average air-fuel ratio of the exhaust gas.

Further, hydrogen of the unburned gas, etc., passes through the diffusion regulation layer of the air-fuel ratio sensor in fast speed. Therefore, if the concentration of hydrogen in the exhaust gas is high, the output air-fuel ratio of the upstream side air-fuel ratio sensor 40 deviates to the lower side (i.e., the richer side) than the actual air-fuel ratio of the exhaust gas.

If deviation occurs in the output air-fuel ratio of the upstream side air-fuel ratio sensor 40 in this way, even if the above mentioned control is performed, sometimes $NO_x$ and oxygen flow out from the upstream side exhaust purification catalyst 20 or a frequency of the unburned gas, etc., flowing out therefrom becomes higher. This phenomenon will be explained with reference to FIG. 12 below.

Figure 12:
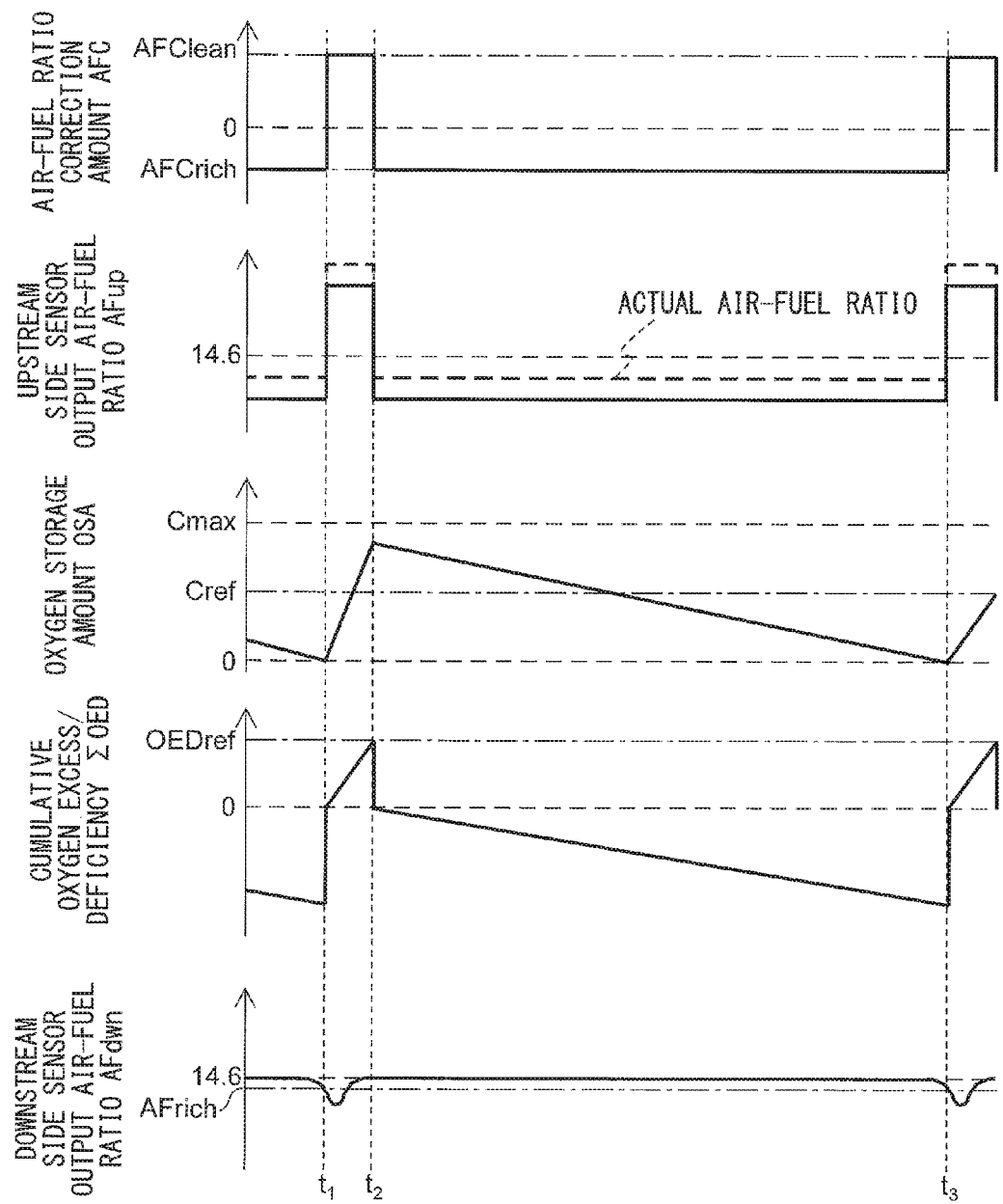
FIG. 12 is a time chart, similar to FIG. 5, showing changes in an oxygen storage amount of an upstream side exhaust purification catalyst etc.

FIG. 12 is a time chart of the oxygen storage amount OSA of the upstream side exhaust purification catalyst 20, etc., similar to FIG. 5. FIG. 12 shows the case where the output air-fuel ratio of the upstream side air-fuel ratio sensor 40 deviates to the rich side. In the figure, the solid line in the output air-fuel ratio AFup of the upstream side air-fuel ratio sensor 40 shows the output air-fuel ratio of the upstream side air-fuel ratio sensor 40. On the other hand, the broken line shows the actual air-fuel ratio of the exhaust gas flowing around the upstream side air-fuel ratio sensor 40.

In the example shown in FIG. 12 as well, in the state before the time $t_1$, the air-fuel ratio correction amount AFC is set to the rich set correction amount AFCrich, and therefore the target air-fuel ratio is set to the rich set air-fuel ratio. Along with this, the output air-fuel ratio AFup of the upstream side air-fuel ratio sensor 40 becomes an air-fuel ratio equal to the rich set air-fuel ratio. However, since, as explained above, the output air-fuel ratio of the upstream side air-fuel ratio sensor 40 deviates to the rich side, the actual air-fuel ratio of the exhaust gas becomes an air-fuel ratio which is leaner than the rich set air-fuel ratio. That is, the output air-fuel ratio AFup of the upstream side air-fuel ratio sensor 40 becomes lower (richer) than the actual air-fuel ratio (broken line in the figure). For this reason, that is, since the actual air-fuel ratio of the exhaust gas deviates to the lean side, the decreasing speed of the oxygen storage amount OSA of the upstream side exhaust purification catalyst 20 is slower.

Further, in the example shown in FIG. 12, at the time $t_1$, the output air-fuel ratio AFdown of the downstream side air-fuel ratio sensor 41 reaches the rich judged air-fuel ratio AFrich. Therefore, as explained above, at the time $t_1$, the air-fuel ratio correction amount AFC is switched to the lean set correction amount AFClean. Accordingly, the target air-fuel ratio is switched to the lean set air-fuel ratio.

Along with this, the output air-fuel ratio AFup of the upstream side air-fuel ratio sensor 40 becomes an air-fuel ratio equal to the lean set air-fuel ratio. However, as explained above, the output air-fuel ratio of the upstream side air-fuel ratio sensor 40 deviates to the rich side, and therefore the actual air-fuel ratio of the exhaust gas becomes an air-fuel ratio leaner than the lean set air-fuel ratio. That is, the output air-fuel ratio AFup of the upstream side air-fuel ratio sensor 40 becomes lower (richer) than the actual air-fuel ratio (broken line in the drawing) Therefore, the increasing speed of the oxygen storage amount OSA of the upstream side exhaust purification catalyst 20 becomes faster, and the actual oxygen amount supplied to the upstream side exhaust purification catalyst 20 while the target air-fuel ratio is set to the lean set air-fuel ratio becomes larger than the switching reference storage amount Cref.

In this way, if the output air-fuel ratio AFdwn of the upstream side air-fuel ratio sensor 40 deviates, when the air-fuel ratio correction amount AFC is set to the lean set correction amount AFClean, the lean degree of the air-fuel ratio of the exhaust gas flowing into the upstream side exhaust purification catalyst 20 becomes larger. For this reason, even if the oxygen storage amount OSA of the upstream side exhaust purification catalyst 20 does not reach the maximum storable oxygen amount Cmax, not all of the $NO_x$ or oxygen flowing into the upstream side exhaust purification catalyst 20 can be stored. Sometimes, $NO_x$ or oxygen ends up flowing out from the upstream side exhaust purification catalyst 20. Further, at the time $t_2$, the oxygen storage amount OSA of the upstream side exhaust purification catalyst 20 becomes the switching reference storage amount Cref or more. If, near the time $t_2$, the above-mentioned such unintended deviation of the air-fuel ratio etc. occurs, $NO_x$ or oxygen can flow out from the upstream side exhaust purification catalyst 20.

From the above, it becomes necessary to detect deviation in the output air-fuel ratio of the upstream side air-fuel ratio sensor 40 and is necessary to correct the output air-fuel ratio etc. based on the detected deviation.

<Learning Control>

Therefore, in this embodiment of the present invention, to compensate for deviation of the output air-fuel ratio of the upstream side air-fuel ratio sensor 40, during normal operation (that is, when feedback control is carried out based on the above-mentioned target air-fuel ratio), learning control is performed. Below, this learning control will be explained.

Figure 13:
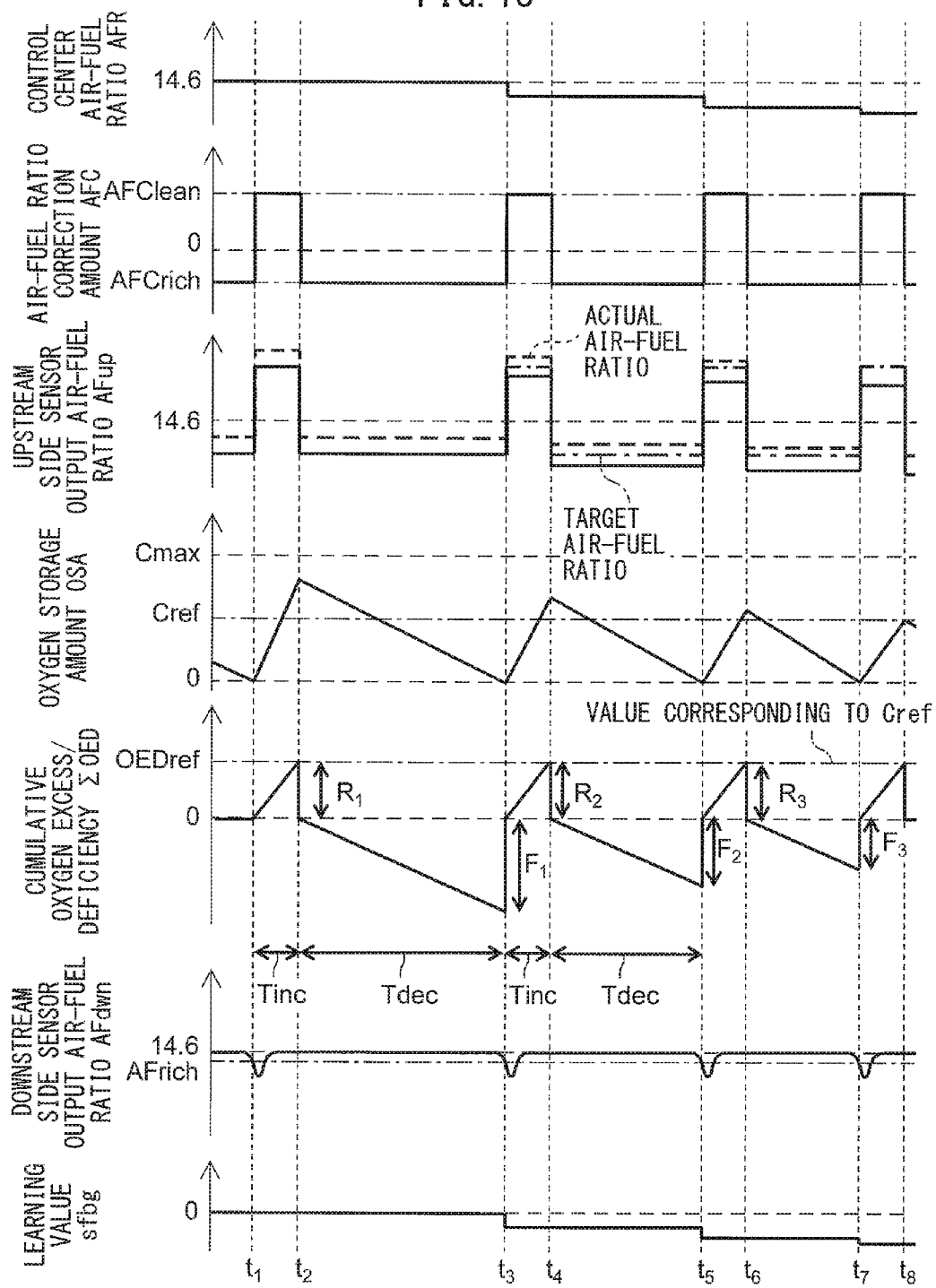
FIG. 13 is a time chart of a control center air-fuel ratio etc.

Here, the time period from when switching the target air-fuel ratio to the lean air-fuel ratio to when the cumulative oxygen excess/deficiency ΣOED becomes the switching reference value OEDref or more, that is, until switching the target air-fuel ratio again to the rich air-fuel ratio, will be defined as the "oxygen increasing time period". Similarly, the time period from when switching the target air-fuel ratio to the rich air-fuel ratio to when the output air-fuel ratio of the downstream side air-fuel ratio sensor 41 becomes the rich judged air-fuel ratio or less, that is, until switching the target air-fuel ratio again to the lean air-fuel ratio, will be defined as the "oxygen decreasing time period". In the learning control of the present embodiment, the cumulative oxygen excess amount is calculated as the absolute value of the cumulative oxygen excess/deficiency ΣOED in the oxygen increasing time period. Note that, the cumulative oxygen excess amount expresses the cumulative value of the amount of oxygen becoming an excess when trying to make the air-fuel ratio of the exhaust gas flowing into the upstream side exhaust purification catalyst 20 the stoichiometric air-fuel ratio in the oxygen increasing time period. In addition, the cumulative oxygen deficiency amount is calculated as the absolute value of the cumulative oxygen excess/deficiency ΣOED in the oxygen decreasing time period. Note that, the cumulative oxygen deficiency amount expresses the cumulative value of the amount of oxygen becoming deficient when trying to make the air-fuel ratio of the exhaust gas flowing into the upstream side exhaust purification catalyst 20 the stoichiometric air-fuel ratio in the oxygen decreasing time period. Further, the control center air-fuel ratio AFR is corrected so that the difference of these cumulative oxygen excess amount and cumulative oxygen deficiency amount becomes smaller. FIG. 13 shows this state.

FIG. 13 is a time chart of the control center air-fuel ratio AFR, the air-fuel ratio correction amount AFC, the output air-fuel ratio AFup of the upstream side air-fuel ratio sensor 40, the oxygen storage amount OSA of the upstream side exhaust purification catalyst 20, the cumulative oxygen excess/deficiency ΣOED, the output air-fuel ratio AFdwn of the downstream side air-fuel ratio sensor 41, and the learning value sfbg. FIG. 13 shows the case, like FIG. 12, where the output air-fuel ratio AFup of the upstream side air-fuel ratio sensor 40 deviates to the low side (rich side). Note that, the learning value sfbg is a value which changes in accordance with the deviation of the output air-fuel ratio of the upstream side air-fuel ratio sensor 40 and is used for correction of the control center air-fuel ratio AFR in the present embodiment. Further, in the figure, the solid line in the output air-fuel ratio AFup of the upstream side air-fuel ratio sensor 40 indicates the air-fuel ratio corresponding to the output detected by the upstream side air-fuel ratio sensor 40, and the broken line indicates actual air-fuel ratio of the exhaust gas flowing around the upstream side air-fuel ratio sensor 40. Further, the one-dot chain line indicates the target air-fuel ratio, i.e., an air-fuel ratio of the stoichiometric air-fuel ratio plus the air-fuel ratio correction amount AFC and learning value sfbg.

In the example shown in FIG. 13, similarly to FIGS. 5 and 12, in the state before the time $t_1$, the control center air-fuel ratio is set to the stoichiometric air-fuel ratio, and the air-fuel ratio correction amount AFC is set to the rich set correction amount AFCrich. At this time, the output air-fuel ratio AFup of the upstream side air-fuel ratio sensor 40, as shown by the solid line, becomes an air-fuel ratio corresponding to the rich set air-fuel ratio. However, since the output air-fuel ratio AFup of the upstream side air-fuel ratio sensor 40 deviates, the actual air-fuel ratio of the exhaust gas is an air-fuel ratio which is leaner than the rich set air-fuel ratio (the broken line in FIG. 13). However, in the example shown in FIG. 13, as will be understood from the broken line of FIG. 13, the actual air-fuel ratio of the exhaust gas before the time $t_1$ becomes a rich air-fuel ratio which is leaner than the rich set air-fuel ratio. Therefore, the oxygen storage amount of the upstream side exhaust purification catalyst 20 is gradually decreased.

At the time $t_1$, the output air-fuel ratio AFdwn of the downstream side air-fuel ratio sensor 41 reaches the rich judged air-fuel ratio AFrich. Due to this, as explained above, the air-fuel ratio correction amount AFC is switched to the lean set correction amount AFClean. After the time $t_1$, the output air-fuel ratio of the upstream side air-fuel ratio sensor 40 becomes an air-fuel ratio corresponding to the lean set air-fuel ratio. However, due to deviation of the output air-fuel ratio of the upstream side air-fuel ratio sensor 40, the actual air-fuel ratio of the exhaust gas becomes an air-fuel ratio which is leaner than the lean set air-fuel ratio, that is, an air-fuel ratio with a great lean degree (see broken line of FIG. 13). Therefore, the oxygen storage amount OSA of the upstream side exhaust purification catalyst 20 rapidly increases.

On the other hand, the oxygen excess/deficiency OED is calculated based on the output air-fuel ratio AFup of the upstream side air-fuel ratio sensor 40. However, as explained above, deviation occurs in the output air-fuel ratio AFup of the upstream side air-fuel ratio sensor 40. Therefore, the calculated oxygen excess/deficiency OED becomes a value smaller than the actually oxygen excess/deficiency OED (i.e., a smaller amount of oxygen). As a result, the cumulative oxygen excess/deficiency ΣOED becomes smaller than the actual amount.

At the time $t_2$, the cumulative oxygen excess/deficiency ΣOED reaches the switching reference value OEDref. Therefore, the air-fuel ratio correction amount AFC is switched to the rich set correction amount AFCrich. Therefore, the target air-fuel ratio is set to the rich air-fuel ratio. At this time, the actual oxygen storage amount OSA, as shown in FIG. 13, becomes greater than the switching reference storage amount Cref.

After the time $t_2$, similarly to the state before the time $t_1$, the air-fuel ratio correction amount AFC is set to the rich set correction amount AFCrich and accordingly the target air-fuel ratio is set to the rich air-fuel ratio. At this time as well, the actual air-fuel ratio of the exhaust gas is an air-fuel ratio which is leaner than the rich set air-fuel ratio. As a result, the upstream side exhaust purification catalyst 20 becomes slower in speed of decrease of the oxygen storage amount OSA. In addition, as explained above, at the time $t_2$, the actual oxygen storage amount of the upstream side exhaust purification catalyst 20 becomes greater than the switching reference storage amount Cref. Therefore, time is taken until the actual oxygen storage amount OSA of the upstream side exhaust purification catalyst 20 reaches zero.

At the time $t_3$, the output air-fuel ratio AFdwn of the downstream side air-fuel ratio sensor 41 reaches the rich judged air-fuel ratio AFrich. Due to this, as explained above, the air-fuel ratio correction amount AFC is switched to the lean set correction amount AFClean. Therefore, the target air-fuel ratio is switched from the rich set air-fuel ratio to the lean set air-fuel ratio.

In the present embodiment, as explained above, the cumulative oxygen excess/deficiency ΣOED is calculated from the time $t_1$ to the time $t_2$. In this regard, if referring to the time period from when the target air-fuel ratio is switched to the lean air-fuel ratio (time $t_1$) to when the estimated value of the oxygen storage amount OSA of the upstream side exhaust purification catalyst 20 becomes the switching reference storage amount Cref or more (time $t_2$), as the "oxygen increase time period Tinc", in the present embodiment, the cumulative oxygen excess/deficiency ΣOED is calculated in the oxygen increase time period Tinc. In FIG. 13, the absolute value of the cumulative oxygen excess/deficiency ΣOED in the oxygen increase time period Tinc from the time $t_1$ to time $t_2$ (the cumulative oxygen excess amount) is shown as $R_1$.

This cumulative oxygen excess amount $R_1$ corresponds to the oxygen storage amount OSA at the time $t_2$. However, as explained above, estimation of the oxygen excess/deficiency OED uses the output air-fuel ratio AFup of the upstream side air-fuel ratio sensor 40, and deviation occurs in this output air-fuel ratio AFup. Therefore, in the example shown in FIG. 13, the cumulative oxygen excess amount $R_1$ from the time $t_1$ to time $t_2$ becomes smaller than the value which corresponds to the actual oxygen storage amount OSA at the time $t_2$.

Further, in the present embodiment, the cumulative oxygen excess/deficiency ΣOED is also calculated from the time $t_2$ to time $t_3$. In this regard, if referring to the time period from when the target air-fuel ratio is switched to the rich air-fuel ratio (time $t_2$) to when the output air-fuel ratio AFdwn of the downstream side air-fuel ratio sensor 41 reaches the rich judged air-fuel ratio AFrich (time $t_3$), as the "oxygen decrease time period Tdec", in the present embodiment, the cumulative oxygen excess/deficiency ΣOED is calculated in the oxygen decrease time period Tdec. In FIG. 13, the absolute value of the cumulative oxygen excess/deficiency ΣOED at the oxygen decrease time period Tdec from the time $t_2$ to time $t_3$ is shown as $F_1$.

This cumulative oxygen deficiency amount $F_1$ corresponds to the total oxygen amount which is released from the upstream side exhaust purification catalyst 20 from the time $t_2$ to the time $t_3$. However, as explained above, deviation occurs in the output air-fuel ratio AFup of the upstream side air-fuel ratio sensor 40. Therefore, in the example shown in FIG. 13, the cumulative oxygen deficiency amount $F_1$ from the time $t_2$ to time $t_3$ is larger than the value which corresponds to the total amount of oxygen which is released from the upstream side exhaust purification catalyst 20 from the time $t_2$ to the time $t_3$.

In this regard, in the oxygen increase time period Tinc, oxygen is stored at the upstream side exhaust purification catalyst 20, while in the oxygen decrease time period Tdec, the stored oxygen is completely released. Therefore, the cumulative oxygen excess amount $R_1$ and the cumulative oxygen deficiency amount $F_1$ basically should be the same value. However, as explained above, when deviation occurs in the output air-fuel ratio of the upstream side air-fuel ratio sensor 40, the cumulative value changes in accordance with the deviation. As explained above, when the output air-fuel ratio of the upstream side air-fuel ratio sensor 40 deviates to the low side (rich side), the cumulative oxygen deficiency amount $F_1$ becomes greater than the cumulative oxygen excess amount $R_1$. Conversely, when the output air-fuel ratio of the upstream side air-fuel ratio sensor 40 deviates to the high side (lean side), the cumulative oxygen deficiency amount $F_1$ becomes smaller compared with the cumulative oxygen excess amount $R_1$. In addition, the difference ΔΣOED between the cumulative oxygen excess amount $R_1$ and the cumulative oxygen deficiency amount $F_1$ (=$R_1$−$F_1$. Below, referred to as the "excess/deficiency error") expresses the extent of deviation at the output air-fuel ratio of the upstream side air-fuel ratio sensor 40. It can be considered that the larger this excess/deficiency error ΔΣOED, the greater the deviation in the output air-fuel ratio of the upstream side air-fuel ratio sensor 40.

Therefore, in the present embodiment, based on the excess/deficiency error ΔΣOED, the control center air-fuel ratio AFR is corrected. In particular, in the present embodiment, the control center air-fuel ratio AFR is corrected so that the difference ΔΣOED between the cumulative oxygen excess amount $R_1$ and the cumulative oxygen deficiency amount $F_1$ becomes smaller.

Specifically, in the present embodiment, the learning value sfbg is calculated by the following formula (3), and the control center air-fuel ratio AFR is corrected by the following formula (4).

$$sfbg(n)=sfbg(n-1)+k_1 \cdot \Delta \Sigma OED \quad (3)$$

$$AFR=AFRbase+sfbg(n) \quad (4)$$

Note that, in the above formula (3), "n" expresses the number of calculations or time. Therefore, sfbg(n) is the current calculated value or current learning value. In addition, "$k_1$" in the above formula (3) is the gain which shows the extent by which the excess/deficiency error ΔΣOED is reflected in the control center air-fuel ratio AFR. The larger the value of the gain "$k_1$", the larger the correction amount of the control center air-fuel ratio AFR. In addition, in the above formula (4), the base control center air-fuel ratio AFRbase is a control center air-fuel ratio which is used as base, and is the stoichiometric air-fuel ratio in the present embodiment.

At the time $t_3$ of FIG. 13, as explained above, the learning value sfbg is calculated based on the cumulative oxygen excess amount $R_1$ and the cumulative oxygen deficiency amount $F_1$. In particular, in the example shown in FIG. 13, since the absolute value $F_1$ of the cumulative oxygen excess/deficiency at the oxygen decrease time period Tdec is larger than the absolute value $R_1$ of the cumulative oxygen excess/deficiency at the oxygen increase time period Tinc, at the time $t_3$, the learning value sfbg is decreased.

At this time, as can be understood from the above formula (4), the control center air-fuel ratio AFR is corrected based on the learning value sfbg. In the example shown in FIG. 13, the learning value sfbg is a negative value, and therefore the control center air-fuel ratio AFR becomes a value smaller than the basic control center air-fuel ratio AFRbase, that is, the rich side value. Accordingly, the air-fuel ratio of the exhaust gas flowing into the upstream side exhaust purification catalyst 20 is corrected to the rich side.

As a result, the deviation of the actual air-fuel ratio of the exhaust gas flowing into the upstream side exhaust purification catalyst 20 with respect to the target air-fuel ratio after the time $t_3$ becomes smaller than before the time $t_3$. Therefore, the difference between the broken line indicating the actual air-fuel ratio and the one-dot chain line indicating the target air-fuel ratio after the time $t_3$ becomes smaller than the difference before the time $t_3$.

Further, after the time $t_3$ as well, an operation similar to the operation during the time $t_1$ to time $t_2$ is performed. Therefore, at the time $t_4$, if the cumulative oxygen excess/deficiency ΣOED reaches the switching reference value OEDref, the target air-fuel ratio is switched from the lean set air-fuel ratio to the rich set air-fuel ratio. Then, at the time $t_5$, when the output current Irdwn of the downstream side air-fuel ratio sensor 41 reaches the rich judged air-fuel ratio AFrich, the target air-fuel ratio is again switched to the lean set air-fuel ratio.

The period from the time $t_3$ to time $t_4$, as explained above, corresponds to the oxygen increase time period Tinc. Therefore, the absolute value of the cumulative oxygen excess/deficiency ΣOED during this period is expressed by the cumulative oxygen excess amount $R_2$ of FIG. 13. Further, the period from the time $t_4$ to time $t_5$, as explained above, corresponds to the oxygen decrease time period Tdec, and therefore the absolute value of the cumulative oxygen excess/deficiency ΣOED during this period is expressed by the cumulative oxygen deficiency amount $F_2$ of FIG. 13. Further, the learning value sfbg is updated based on the difference $\Delta\Sigma OED(=R_2-F_2)$ of the cumulative oxygen excess amount $R_2$ and the cumulative oxygen deficiency amount $F_2$ by using the above formula (3). In the present embodiment, similar control is repeated after the time $t_5$ and, due to this, the learning value sfbg is repeatedly updated.

By updating the learning value sfbg by the learning control as stated above, the output air-fuel ratio AFup of the upstream side air-fuel ratio sensor 40 is gradually separated away from the target air-fuel ratio, but the actual air-fuel ratio of the exhaust gas flowing into the upstream side exhaust purification catalyst 20 gradually approaches the target air-fuel ratio. Due to this, it is possible to gradually compensate the deviation in the output air-fuel ratio of the upstream side air-fuel ratio sensor 40.

Note that, as explained above, the learning value sfbg is updated based on the cumulative oxygen excess/deficiency ΣOED at the oxygen increasing time period Tinc and the cumulative oxygen excess/deficiency ΣOED in the oxygen decreasing time period Tdec directly following this oxygen increasing time period Tinc. This is because, as explained above, the total amount of oxygen stored at the upstream side exhaust purification catalyst 20 in the oxygen increasing time period Tinc and the total amount of oxygen released from the upstream side exhaust purification catalyst 20 in the directly following oxygen decreasing time period Tdec become equal.

In addition, in the present embodiment, based on the cumulative oxygen excess/deficiency ΣOED at one oxygen increasing time period Tinc and the cumulative oxygen excess/deficiency ΣOED at one oxygen decreasing time period Tdec, the learning value sfbg is updated. However, the learning value sfbg may be updated based on the total value or average value of the cumulative oxygen excess/deficiency ΣOED at a plurality of oxygen increasing time periods Tinc and the total value or average value of the cumulative oxygen excess/deficiency ΣOED at a plurality of oxygen decreasing time periods Tdec.

Further, in the present embodiment, based on the learning value sfbg, the control center air-fuel ratio is corrected. However, what is corrected based on the learning value sfbg may be another parameter relating to the air-fuel ratio. As the other parameter, for example, the amount of feed of fuel to the combustion chamber 5, the output air-fuel ratio of the upstream side air-fuel ratio sensor 40, the air-fuel ratio correction amount, etc. may be mentioned.

Note that, in the present embodiment as well, as the air-fuel ratio control, the above-mentioned other control may also be performed. Specifically, as the other control, for example, control may be considered where the target air-fuel ratio is switched to the rich air-fuel ratio when the output air-fuel ratio of the downstream side air-fuel ratio sensor 41 becomes the lean judged air-fuel ratio or more and the target air-fuel ratio is switched to the lean air-fuel ratio when the output air-fuel ratio of the downstream side air-fuel ratio sensor 41 becomes the rich judged air-fuel ratio or less.

In this case, the cumulative oxygen deficiency amount is calculated as the absolute value of the cumulative oxygen excess/deficiency in the oxygen decreasing time period from when the target air-fuel ratio is switched to the rich air-fuel ratio to when the output air-fuel ratio of the downstream side air-fuel ratio sensor 41 becomes the rich judged air-fuel ratio or less. In addition, the cumulative oxygen excess amount is calculated as the absolute value of the cumulative oxygen excess/deficiency in the oxygen increasing period from when the target air-fuel ratio is switched to the lean air-fuel ratio to when the output air-fuel ratio of the downstream side air-fuel ratio sensor 41 becomes the lean judged air-fuel ratio or more. Further, the control center air-fuel ratio etc. are corrected so that the difference between these cumulative oxygen excess amount and cumulative oxygen deficiency amount becomes smaller.

Therefore, summarizing the above, in the present embodiment, it can be said that, in learning control, based on the cumulative oxygen excess amount in the oxygen increasing period from when switching the target air-fuel ratio to the lean air-fuel ratio to when again switching it to the rich air-fuel ratio, and the cumulative oxygen deficiency amount in the oxygen decreasing time period from when switching the target air-fuel ratio to the rich air-fuel ratio to when again switching it to the lean air-fuel ratio, a parameter relating to the air-fuel ratio is corrected so that the difference of these cumulative oxygen excess amount and cumulative oxygen deficiency amount becomes smaller.

<Behavior when Suffering from Cracked Element>

As explained above, if the downstream side air-fuel ratio sensor 41 suffers from a cracked element, basically, when the air-fuel ratio of the exhaust gas around the downstream side air-fuel ratio sensor 41 is the rich air-fuel ratio, the output air-fuel ratio AFdwn of the downstream side air-fuel ratio sensor 41 becomes a lean air-fuel ratio. However, such a phenomenon sometimes does not occur depending on the flow rate of the exhaust gas flowing around the downstream side air-fuel ratio sensor 41.

Figure 14:
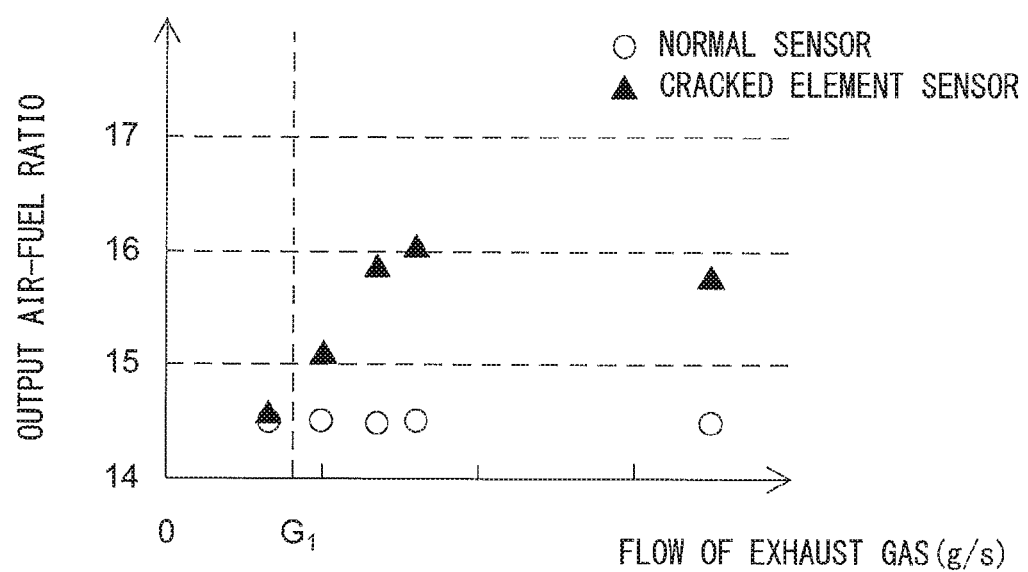
FIG. 14 is a view showing a relationship between a flow rate of exhaust gas flowing around a downstream side air-fuel ratio sensor and an output air-fuel ratio of a downstream side air-fuel ratio sensor.

FIG. 14 is a view showing the relationship between the flow rate of the exhaust gas flowing around the downstream side air-fuel ratio sensor 41 and the output air-fuel ratio AFdwn of the downstream side air-fuel ratio sensor 41. FIG. 14 shows the case where the air-fuel ratio of the exhaust gas flowing around the downstream side air-fuel ratio sensor 41 has become a rich air-fuel ratio slightly richer than the stoichiometric air-fuel ratio. Further, the circle marks in the figure show the case of use of a normal sensor not suffering from a cracked element, while the triangle marks in the figure show the case of use of a sensor suffering from a cracked element.

As will be understood from FIG. 14, when the flow rate of the exhaust gas flowing around the downstream side air-fuel ratio sensor 41 is large, if the downstream side air-fuel ratio sensor 41 does not suffer from a cracked element, the output air-fuel ratio AFdwn will match the actual air-fuel ratio of the exhaust gas. Therefore, in the example shown in FIG. 14, the output air-fuel ratio AFdwn becomes an air-fuel ratio slightly richer than the stoichiometric air-fuel ratio. On the other hand, if, at this time, the downstream side air-fuel ratio sensor 41 suffers from a cracked element, as explained above, the output air-fuel ratio AFdwn will become a lean air-fuel ratio. As opposed to this, when the flow rate of the exhaust gas flowing around the downstream side air-fuel ratio sensor 41 is small, regardless of whether or not the downstream side air-fuel ratio sensor 41 suffers from a cracked element, the output air-fuel ratio AFdwn will match the actual air-fuel ratio of the exhaust gas and will become an air-fuel ratio slightly richer than the stoichiometric air-fuel ratio.

The reason why, in this way, even if the downstream side air-fuel ratio sensor 41 suffers from a cracked element, when the flow rate of the exhaust gas is small, the above-mentioned such phenomenon does not occur is believed to be as follows. That is, if the flow rate of the exhaust gas flowing around the downstream side air-fuel ratio sensor 41 is small, the flow rate of the exhaust gas which enters the reference gas chamber 55 through this cracked part becomes smaller. For this reason, even if exhaust gas enters into the reference gas chamber 55 through this crack, the concentration of oxygen around the atmosphere side electrode 53 does not change that much. As a result of this, the output air-fuel ratio AFdwn of the downstream side air-fuel ratio sensor 41 also does not change and a correct air-fuel ratio is output.

<Mistaken Learning Due to Cracked Element>

When the downstream side air-fuel ratio sensor 41 suffers from a cracked element, the output air-fuel ratio exhibits the above-mentioned behavior, so if performing the above-mentioned learning control, sometimes the learning value ends up being mistakenly updated. This mistaken updating of the learning value will be explained with reference to FIG. 15.

Figure 15:
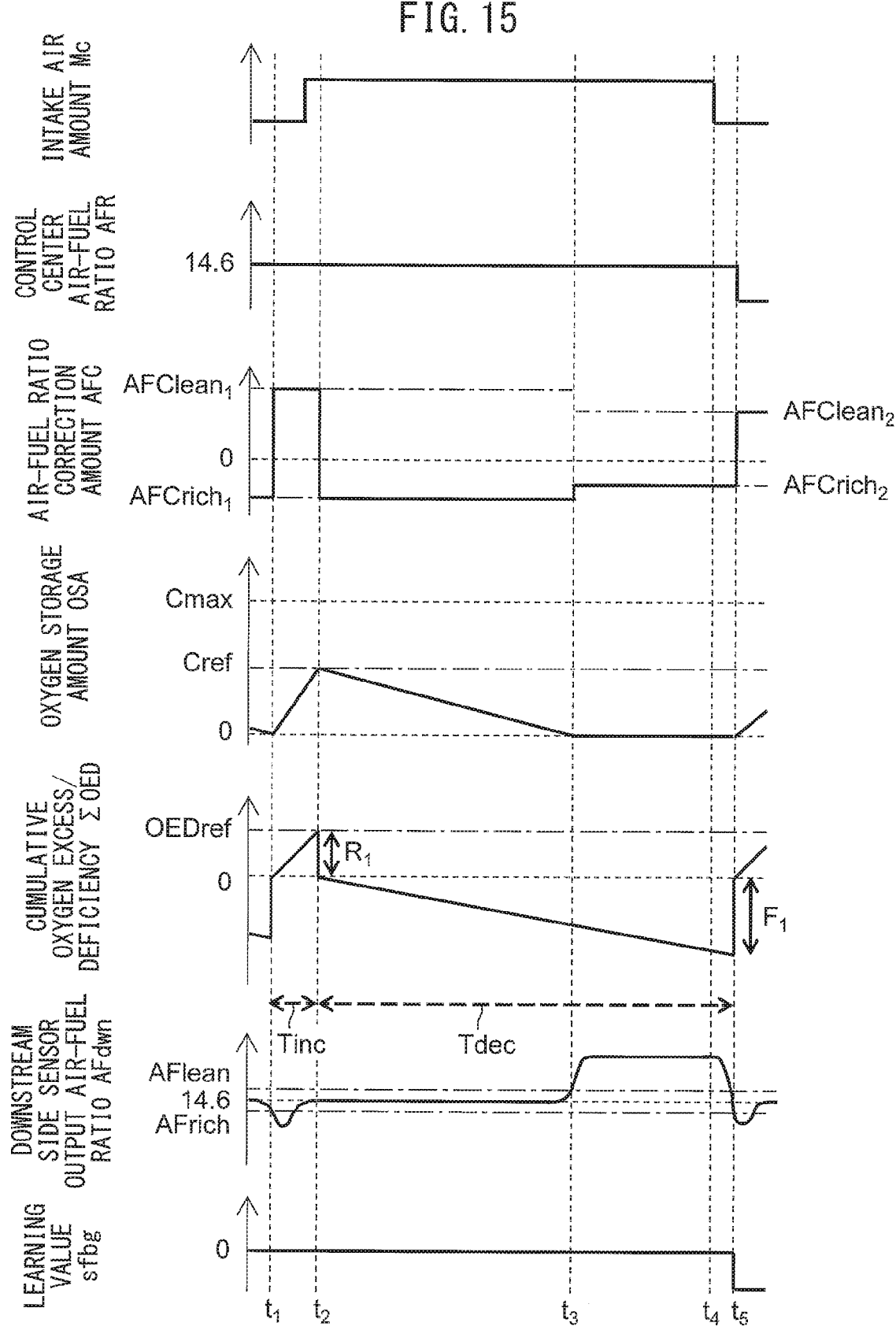
FIG. 15 is a time chart showing changes in an air-fuel ratio correction amount etc. when a downstream side air-fuel ratio sensor suffers from a cracked element.

FIG. 15 is a time chart of parameters when the downstream side air-fuel ratio sensor 41 suffers from a cracked element such as an intake air amount Mc, control center air-fuel ratio AFR, air-fuel ratio correction amount AFC, oxygen storage amount OSA of the upstream side exhaust purification catalyst 20, cumulative oxygen excess/deficiency ΣOED, output air-fuel ratio AFdwn of the downstream side air-fuel ratio sensor 41, and learning value sfbg. In the example shown in FIG. 15, the output air-fuel ratio AFup of the upstream side air-fuel ratio sensor 40 does not suffer from error.

In the example shown in FIG. 15, in the state before the time $t_1$, the air-fuel ratio correction amount AFC is set to the rich set correction amount AFCrich. For this reason, the oxygen storage amount OSA of the upstream side exhaust purification catalyst 20 gradually decreases and unburned gas etc. start to flow out from the upstream side exhaust purification catalyst 20 near the time $t_1$. At this time, the intake air amount Mc to the combustion chamber 5 of the internal combustion engine is relatively small and accordingly the flow rate of the exhaust gas flowing around the downstream side air-fuel ratio sensor 41 is relatively small. For this reason, if the air-fuel ratio of the exhaust gas flowing around the downstream side air-fuel ratio sensor 41 becomes the rich air-fuel ratio, along with this, the output air-fuel ratio AFdwn of the downstream side air-fuel ratio sensor 41 also becomes the rich air-fuel ratio. As a result of this, in the illustrated example, at the time $t_1$, the output air-fuel ratio AFdwn of the downstream side air-fuel ratio sensor 41 becomes the rich set air-fuel ratio AFrich or less. For this reason, the air-fuel ratio correction amount AFC is switched from the rich set correction amount AFCrich to the lean set correction amount AFClean.

If, at the time $t_1$, the air-fuel ratio correction amount AFC is switched to the lean set correction amount AFClean, the oxygen storage amount OSA of the upstream side exhaust purification catalyst 20 gradually increases. Further, along with this, the cumulative oxygen excess/deficiency ΣOED also gradually increases and, at the time $t_2$, reaches the switching reference value OEDref. For this reason, at the time $t_2$, the air-fuel ratio correction amount AFC is switched from the lean set correction amount AFClean to the rich set correction amount AFCrich.

If the air-fuel ratio correction amount AFC is switched to the rich set correction amount AFCrich, the oxygen storage amount OSA of the upstream side exhaust purification catalyst 20 gradually decreases. Near the time $t_3$, the oxygen storage amount OSA of the upstream side exhaust purification catalyst 20 reaches substantially zero. For this reason, near the time $t_3$, unburned gas etc. starts to flow out from the upstream side exhaust purification catalyst 20.

At this time, in the example shown in FIG. 15, the intake air amount Mc to the combustion chamber 5 of the internal combustion engine becomes relatively large. Accordingly, the flow rate of the exhaust gas flowing around the downstream side air-fuel ratio sensor 41 is also relatively large. For this reason, if the air-fuel ratio of the exhaust gas flowing around the downstream side air-fuel ratio sensor 41 becomes the rich air-fuel ratio, the output air-fuel ratio AFdwn of the downstream side air-fuel ratio sensor 41 becomes the lean air-fuel ratio. Therefore, at the time $t_3$, the output air-fuel ratio AFdwn of the downstream side air-fuel ratio sensor 41 becomes the lean judged air-fuel ratio AFlean or more and it is judged that the downstream side air-fuel ratio sensor 41 suffers from the abnormality of a cracked element.

However, the output air-fuel ratio AFdwn of the downstream side air-fuel ratio sensor 41 does not become a rich judged air-fuel ratio AFrich or less, so the air-fuel ratio correction amount AFC continues to be maintained at the rich set correction amount. For this reason, unburned gas etc. flow out from the upstream side exhaust purification catalyst 20 and, further, the output air-fuel ratio AFdwn of the downstream side air-fuel ratio sensor 41 is maintained at an air-fuel ratio larger than the lean judged air-fuel ratio AFlean.

After that, in the example shown in FIG. 15, at the time $t_4$, the intake air amount Mc decreases and the flow rate of the exhaust gas flowing around the downstream side air-fuel ratio sensor 41 becomes relatively smaller. For this reason, the output air-fuel ratio AFdwn of the downstream side air-fuel ratio sensor 41 changes toward a correct air-fuel ratio corresponding to the actual air-fuel ratio of the exhaust gas. As a result of this, at the time $t_5$, the output air-fuel ratio AFdwn of the downstream side air-fuel ratio sensor 41 becomes the rich judged air-fuel ratio AFrich or less. For this reason, the air-fuel ratio correction amount AFC is switched from the rich set air-fuel ratio AFCrich to the lean set air-fuel ratio AFClean.

Here, as explained above, the oxygen decrease time period used when calculating the learning value sfbg is made the time period from when switching the target air-fuel ratio to the rich air-fuel ratio to when the output air-fuel ratio AFdwn of the downstream side air-fuel ratio sensor 41 reaches the rich judged air-fuel ratio AFrich (or when switching the target air-fuel ratio to the lean air-fuel ratio). For this reason, if calculating the oxygen decrease time period in this way, the oxygen decrease time period ends up becoming extremely long. As a result of this, the cumulative oxygen deficiency $F_1$ from the time $t_2$ to time $t_5$ becomes greater than the cumulative oxygen excess $R_1$ of the time $t_1$ to time $t_2$. As shown in FIG. 15, the learning value sfbg is made to greatly decrease. As a result of this, despite the output air-fuel ratio of the upstream side air-fuel ratio sensor 40 not suffering from error, the learning value sfbg is changed, and the learning value ends up being mistakenly updated. As a result of this, as shown in FIG. 15, the control center air-fuel ratio AFR ends up being mistakenly changed.

<Updating of Learning Value at Time of Abnormality of Cracked Element>

Therefore, in the present embodiment, when the target air-fuel ratio is set to the rich air-fuel ratio, if it is judged that the downstream side air-fuel ratio sensor 41 has become abnormal, even if after that the output air-fuel ratio AFdwn of the downstream side air-fuel ratio sensor 41 becomes the rich judged air-fuel ratio AFrich or less and the target air-fuel ratio is switched to the lean air-fuel ratio, correction of the learning valve sfbg based on the cumulative oxygen deficiency amount at this time is stopped.

In addition, in the present embodiment, if, when the target air-fuel ratio is set to the rich air-fuel ratio, the output air-fuel ratio AFdwn of the downstream side air-fuel ratio sensor 41 changes from an air-fuel ratio richer than the lean judged air-fuel ratio AFlean to an air-fuel ratio leaner than the lean judged air-fuel ratio AFlean and thereby it is judged that the downstream side air-fuel ratio sensor 41 has become abnormal, the absolute value of the cumulative oxygen excess/deficiency $\Sigma$OED in the time period from when switching the target air-fuel ratio to the rich air-fuel ratio the last time to when the output air-fuel ratio AFdwn of the downstream side air-fuel ratio sensor 41 changes from an air-fuel ratio richer than the lean judged air-fuel ratio AFlean to an air-fuel ratio leaner than the lean judged air-fuel ratio AFlean is calculated as the cumulative oxygen deficiency amount F, and the difference between the thus calculated cumulative oxygen deficiency amount F and cumulative oxygen excess amount R is made to become smaller by correcting the learning value sfbg. Below, referring to FIG. 16, the method of updating the learning value in the present embodiment will be explained.

Figure 16:
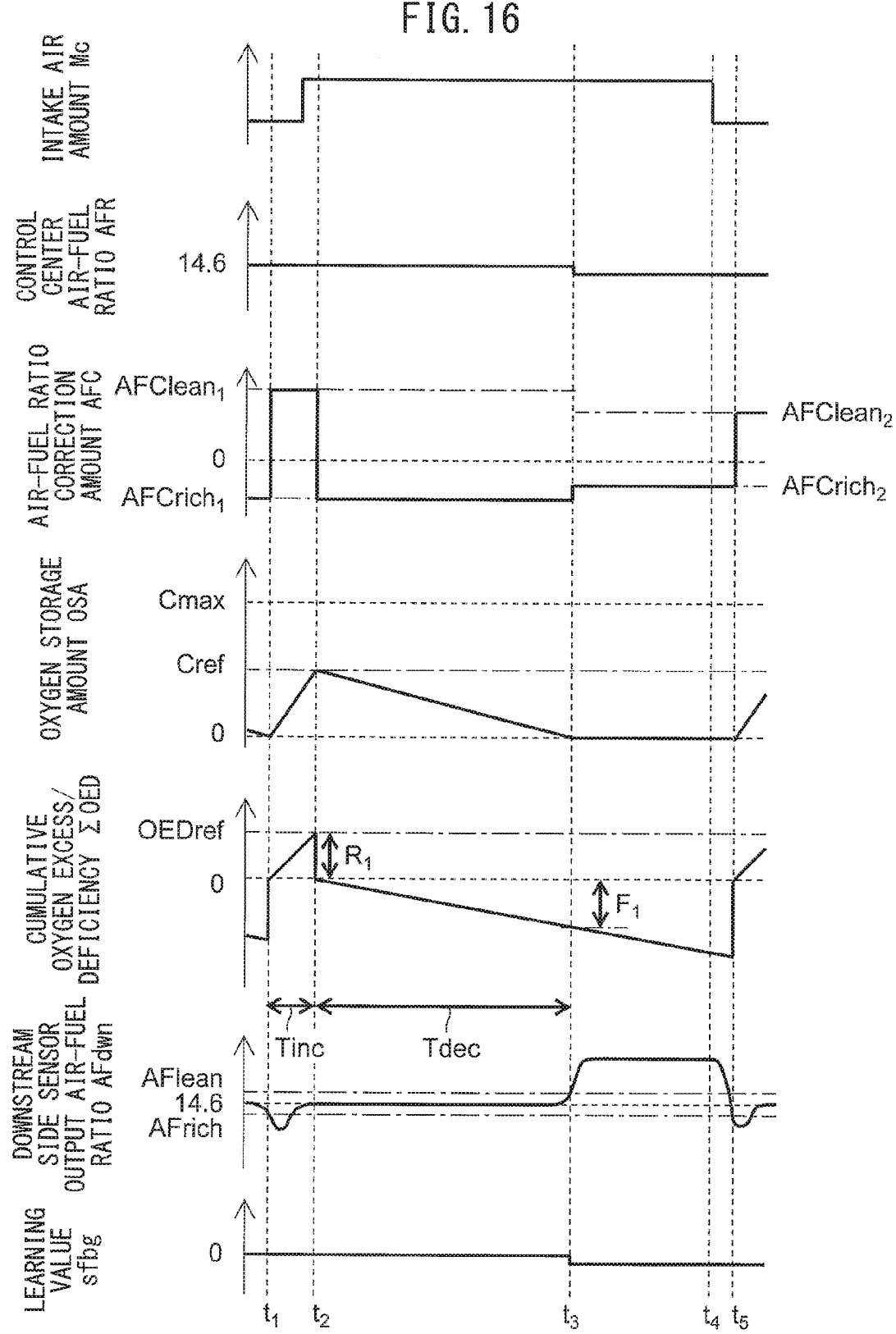
FIG. 16 is a time chart, similar to FIG. 15, showing changes in an air-fuel ratio correction amount etc.

FIG. 16 is a time chart, similar to FIG. 15, showing the air-fuel ratio correction amount AFC etc. FIG. 16 shows the case where the output air-fuel ratio AFup of the upstream side air-fuel ratio sensor 40 suffers from a slight error. In the example shown in FIG. 16 as well, up to the time $t_3$, the parameters trend in the same way as in the example shown in FIG. 15.

Further, in the example shown in FIG. 16 as well, at the time $t_3$, the output air-fuel ratio AFdwn of the downstream side air-fuel ratio sensor 41 reaches the lean judged air-fuel ratio AFlean, and it is judged that the downstream side air-fuel ratio sensor 41 suffers from the abnormality of a cracked element. At this time, as will be understood from FIG. 16, the oxygen storage amount OSA becomes substantially zero and, accordingly, in actuality, rich air-fuel ratio exhaust gas flows out from the upstream side exhaust purification catalyst 20. Therefore, the cumulative oxygen excess/deficiency $\Sigma$OED at the time $t_2$ to time $t_3$ expresses the amount of oxygen which is released from the upstream side exhaust purification catalyst 20 from the time $t_2$ to the time $t_3$ and corresponds to the oxygen storage amount of the upstream side exhaust purification catalyst 20 at the time $t_2$. That is, the time $t_2$ to the time $t_3$ corresponds to the oxygen decrease time period Tdec in FIG. 13, while the cumulative oxygen excess/deficiency $\Sigma$OED from the time $t_2$ to the time $t_3$ corresponds to the cumulative oxygen deficiency amount F shown in FIG. 13.

For this reason, if the output air-fuel ratio AFup of the upstream side air-fuel ratio sensor 40 does not suffer from deviation, the cumulative oxygen excess amount $R_1$ at the oxygen increase time period Tinc from the time $t_1$ to the time $t_2$ and the cumulative oxygen deficiency amount $F_1$ at the oxygen decrease time period Tdec from the time $t_2$ to the time $t_3$ become the same value. However, when the upstream side air-fuel ratio sensor 40 suffers from deviation, these cumulative oxygen excess amount R and cumulative oxygen deficiency amount $F_1$ become different values.

Therefore, in the present embodiment, the learning value sfbg is calculated by the above formula (3) based on the difference between the cumulative oxygen excess amount $R_1$ at the oxygen increase time period Tinc from the time $t_1$ to the time $t_2$ and the cumulative oxygen deficiency amount $F_1$ at the oxygen decrease time period Tdec from the time $t_2$ to the time $t_3$ when the output air-fuel ratio AFdwn of the downstream side air-fuel ratio sensor 41 becomes the lean judged air-fuel ratio AFlean or more, that is, the excess/deficiency difference $\Delta\Sigma$OED($=R_1-F_1$). Further, the control center air-fuel ratio AFR is corrected by the above formula (4) based on the calculated learning value sfbg.

As a result of this, in the example shown in FIG. 16, the cumulative oxygen deficiency amount $F_1$ is greater than the cumulative oxygen excess amount $R_1$, so, at the time $t_3$, the learning value sfbg is made to decrease. Further, as a result of this, the control center air-fuel ratio AFR is made to decrease. Due to this, according to the present embodiment, even if the downstream side air-fuel ratio sensor 41 suffers from the abnormality of a cracked element, it is possible to suitably update the learning value sfbg and accordingly possible to suitably compensate for deviation in the output air-fuel ratio of the upstream side air-fuel ratio sensor 40.

Further, in the example shown in FIG. 16, in the same way as in the example shown in FIG. 15, at the time $t_4$, the intake air amount Mc is decreased and the flow rate of the exhaust gas flowing around the downstream side air-fuel ratio sensor 41 becomes relatively smaller. For this reason, the output air-fuel ratio AFdwn of the downstream side air-fuel ratio sensor 41 changes toward the rich air-fuel ratio at the time $t_4$ on and, at the time $t_5$, becomes the rich judged air-fuel ratio AFrich or less. For this reason, the air-fuel ratio correction amount AFC is switched from the rich set air-fuel ratio AFCrich to the lean set air-fuel ratio AFClean.

At this time, in the present embodiment, at the time $t_5$, the update of the learning value sfbg is stopped and accordingly the correction of the control center air-fuel ratio AFR is stopped. As explained with reference to FIG. 15, if updating the learning value sfbg based on the cumulative oxygen deficiency at the time $t_2$ to the time $t_5$, the learning value sfbg ends up being mistakenly updated. In the present embodiment, at the time $t_5$, the learning value sfbg is not updated based on the cumulative oxygen deficiency from the time $t_2$ to the time $t_5$, so the learning value sfbg is prevented from being mistakenly updated.

Note that, in the above embodiment, at the time $t_3$, the learning value sfbg is updated, but the learning value sfbg does not necessarily have to be updated at this time. That is, due to a reason other than the downstream side air-fuel ratio sensor 41 suffering from a cracked element, when the air-fuel ratio correction amount AFC to be set to the rich set correction amount AFCrich, the output air-fuel ratio AFdwn of the downstream side air-fuel ratio sensor 41 sometimes becomes the lean judged air-fuel ratio AFlean or more. As such a case, for example, the case where the engine load suddenly changes and the air-fuel ratio of the exhaust gas flowing into the upstream side exhaust purification catalyst 20 suddenly changes etc. may be considered. By not updating the learning value sfbg at the time $t_3$, the learning value is kept from being mistakenly updated in such a case.

<Explanation of Control in Second Embodiment>

Figure 17:
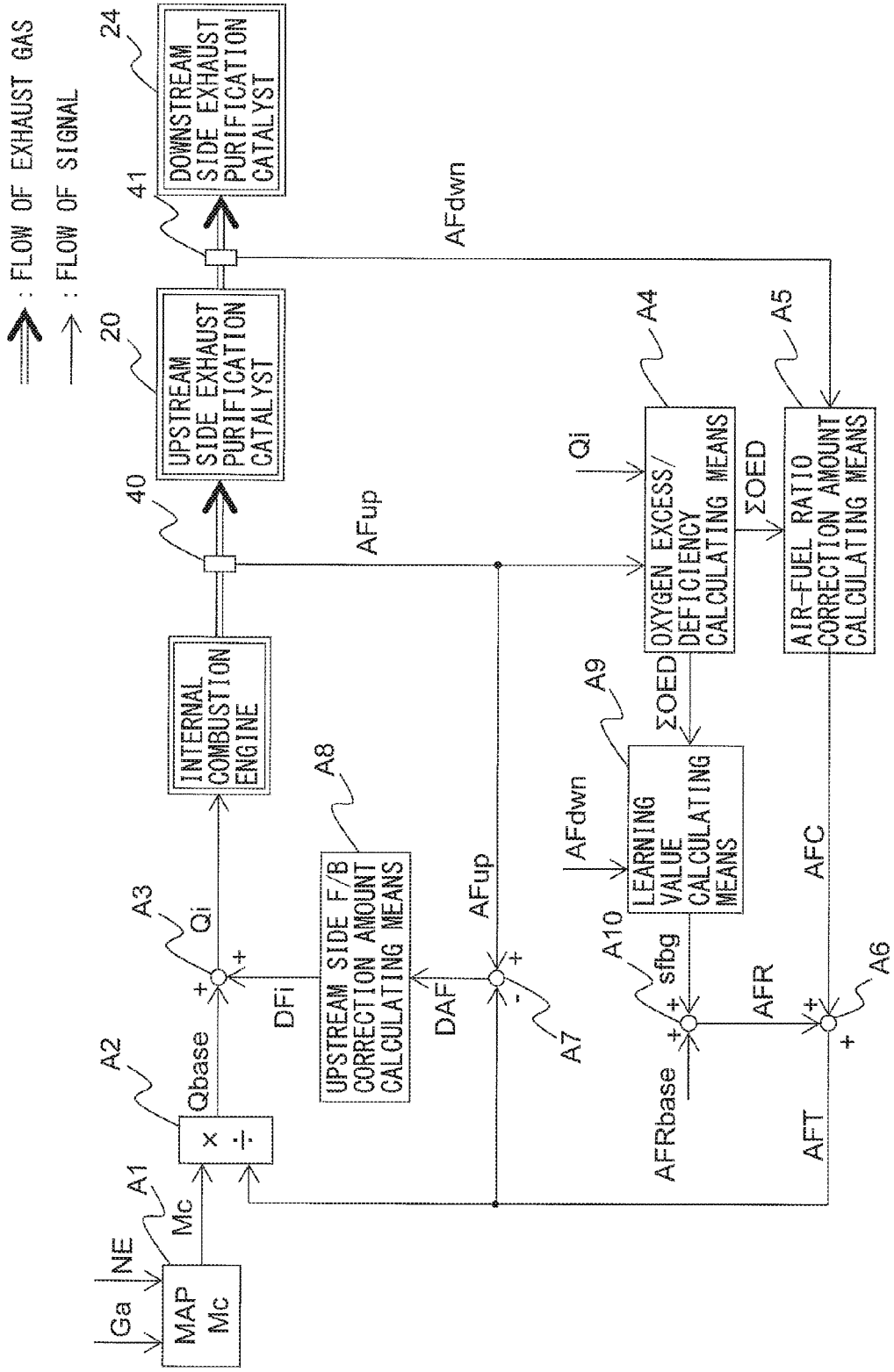
FIG. 17 is a functional block diagram of a control device.

Next, referring to FIG. 17 and FIG. 18, a control device in the present embodiment will be specifically explained. The control device in the present embodiment, as shown in FIG. 17, is configured including the functional blocks A1 to A10. Among these, the functional blocks A1 to A8 are similar to the functional blocks A1 to A8 in the first embodiment, so basically the explanation is omitted.

In the learning value calculating means A9, the learning value sfbg is calculated based on the output air-fuel ratio AFdwn of the downstream side air-fuel ratio sensor 41, the cumulative oxygen excess/deficiency ΣOED calculated by the oxygen excess/deficiency calculating means A4, etc. Specifically, the learning value sfbg is calculated based on the flow chart of the learning control shown in FIG. 18. The thus calculated learning value sfbg is stored in a storage medium in the RAM 33 of the ECU 31 which is not erased even if the ignition key of the vehicle mounting the internal combustion engine is turned off.

In the control center air-fuel ratio calculating means A10, the control center air-fuel ratio AFR is calculated based on the basic control center air-fuel ratio AFRbase (for example, stoichiometric air-fuel ratio) and the learning value sfbg calculated by the learning value calculating means A9. Specifically, as shown in the above-mentioned formula (4), the control center air-fuel ratio AFR is calculated by adding the learning value sfbg to the basic control center air-fuel ratio AFRbase.

The target air-fuel ratio setting means A6 calculate the target air-fuel ratio AFT by adding the air-fuel ratio correction amount AFC calculated by the air-fuel ratio correction amount calculating means A5 to the control center air-fuel ratio AFR calculated by the control center air-fuel ratio calculating means A10.

<Flow Chart of Learning Control>

FIG. 18 is a flow chart showing a control routine of learning control. The illustrated control routine is performed by interruption at constant time intervals.

As shown in FIG. 18, first, at step S61, it is judged if the condition for updating the learning value sfbg stands. The case where the updating condition stands is, for example, normal control being underway etc. At step S61, if it is judged that the condition for updating the learning value sfbg stands, the routine proceeds to step S62. At step S62, it is judged if the lean set flag F1 has been set to ON. The lean set flag F1 is a flag which is set in the control routine of control for setting the air-fuel ratio correction amount shown in FIG. 9. When, at step S62, it is judged that the lean set flag F1 has been set to ON, that is, when the air-fuel ratio correction amount AFC is set to the lean set correction amount AFClean, the routine proceeds to step S63.

At step S63, it is judged if the timing is the timing for switching the air-fuel ratio correction amount AFC. Specifically, it is judged if, in the interval from when the control routine ended the previous time to when it is started the current time, the air-fuel ratio correction amount AFC was switched from the rich set correction amount AFCrich to the lean set correction amount AFClean. When, at step S63, it is judged that the timing is not the timing for switching the air-fuel ratio correction amount AFC, the routine proceeds to step S64. At step S64, the cumulative oxygen excess/deficiency ΣOED is increased by the current oxygen excess/deficiency OED.

If, after that, the target air-fuel ratio is switched to the rich air-fuel ratio, in the next control routine, at step S62, it is judged that the lean set flag F1 has been set to OFF, and the routine proceeds to step S65. At step S65, it is judged if the timing is the timing for switching the air-fuel ratio correction amount AFC. Specifically, it is judged if, in the interval from when the control routine ended the previous time to when it is started the current time, the air-fuel ratio correction amount AFC was switched from the lean set correction amount AFClean to the rich set correction amount AFCrich. When, at step S65, it is judged that the timing is the timing for switching the air-fuel ratio correction amount AFC, the routine proceeds to step S66. At step S66, the cumulative oxygen excess amount Rn is made the absolute value of the current cumulative oxygen excess/deficiency ΣOED. Next, at step S67, the cumulative oxygen excess/deficiency ΣOED is reset to 0, and the control routine is made to end.

At the next control routine, normally, at step S62, it is judged that the lean set flag F1 is set to OFF, and at step S65, it is judged that the timing is not the timing for switching the air-fuel ratio correction amount AFC. In this case, the present control routine proceeds to step S68. At step S68, the cumulative oxygen excess/deficiency ΣOED is increased by the current oxygen excess/deficiency OED.

After that, if the target air-fuel ratio is switched to the lean air-fuel ratio, at the next control routine, at step S62, it is judged that the lean set flag F1 is set to ON, and, at step S63, it is judged the timing is the timing for switching the air-fuel ratio correction amount AFC. In this case, the present control routine proceeds to step S69. At step S69, it is judged if the downstream side air-fuel ratio sensor 41 has been judged abnormal while the target air-fuel ratio was set to the rich air-fuel ratio. If, at step S69, it is judged that the downstream side air-fuel ratio sensor 41 has not been judged abnormal, the routine proceeds to step S70.

At step S70, the cumulative oxygen deficiency amount Fn is made the absolute value of the current cumulative oxygen excess/deficiency ΣOED. Next, at step S71, the cumulative oxygen excess/deficiency ΣOED is reset to "0". Next, at step S72, the learning value sfbg is updated based on the cumulative oxygen excess amount Rn calculated at step S66 and the cumulative oxygen deficiency amount Fn calculated at step S70, and the control routine is made to end. The thus updated learning value sfbg is used to correct the control center air-fuel ratio AFR by the above formula (4).

On the other hand, when, at step S69, it is judged that the downstream side air-fuel ratio sensor 41 has been judged abnormal, the routine proceeds to step S73. At step S73, the cumulative oxygen excess/deficiency ΣOED obtained in the time period from when the air-fuel ratio correction amount AFC is switched to the rich set correction amount AFCrich to when the output air-fuel ratio AFdwn of the downstream side air-fuel ratio sensor 41 becomes the lean judged air-fuel ratio AFlean or more is calculated as the cumulative oxygen deficiency amount Fn. Next, at step S71, the cumulative oxygen excess/deficiency ΣOED is reset to "0". Next, at step S72, the learning value sfbg is updated based on the cumulative oxygen excess Rn calculated at step S66 and the cumulative oxygen deficiency Fn calculated at step S73, and the control routine is made to end. The thus updated learning value sfbg is used for correcting the control center air-fuel ratio AFR by the above formula (4). Note that, to keep the learning value from being mistakenly updated, if at step S69 it is judged that the downstream side air-fuel ratio sensor 41 has been judged abnormal, at step S72, the learning value sfbg may not be updated.

Note that, in the above first embodiment and second embodiment, when it is judged that downstream side air-fuel ratio sensor 41 suffers from the abnormality of a cracked element, the absolute value of the rich set correction amount AFCrich and the absolute value of the lean set correction amount AFClean are made to decrease. As a result of this, the rich degree of the rich air-fuel ratio comprised of the control center air-fuel ratio plus the rich set correction amount AFCrich is made to fall. In addition, the lean degree of the lean set air-fuel ratio comprised of the control center air-fuel ratio plus the lean set correction amount AFClean is made to fall.

However, when it is judged that the downstream side air-fuel ratio sensor 41 suffers from the abnormality of a cracked element, rather than the absolute value of the rich set correction amount AFCrich and the absolute value of the lean set correction amount AFClean, the rich set air-fuel ratio and the lean set air-fuel ratio may be directly corrected. In this case, when it is judged that the abnormality of a cracked element has occurred, the rich degree of the rich set air-fuel ratio and the lean degree of the lean set air-fuel ratio can be made to decrease.

REFERENCE SIGNS LIST 1. engine body
5. combustion chamber
7. intake port
9. exhaust port
19. exhaust manifold
20. upstream side exhaust purification catalyst
24. downstream side exhaust purification catalyst
31. ECU
40. upstream side air-fuel ratio sensor
41. downstream side air-fuel ratio sensor

The invention claimed is:

1. An exhaust purification system of an internal combustion engine, the exhaust purification system comprising:
    an exhaust purification catalyst provided in an exhaust passage of the internal combustion engine, a downstream side air-fuel ratio sensor provided in the exhaust passage at a downstream side of the exhaust purification catalyst in a direction of flow of exhaust, and a control device performing air-fuel ratio control for controlling an air-fuel ratio of exhaust gas flowing into the exhaust purification catalyst and abnormality diagnosis control for diagnosing the downstream side air-fuel ratio sensor for abnormality based on an output air-fuel ratio of the downstream side air-fuel ratio sensor, wherein,
    in the air-fuel ratio control, the control device alternately and repeatedly switches the air-fuel ratio of the exhaust gas flowing into the exhaust purification catalyst between a rich air-fuel ratio richer than a stoichiometric air-fuel ratio and a lean air-fuel ratio leaner than the stoichiometric air-fuel ratio, and,
    in the abnormality diagnosis control, the control device judges that the downstream side air-fuel ratio sensor has become abnormal when the air-fuel ratio of the exhaust gas flowing into the exhaust purification catalyst is made the rich air-fuel ratio by the air-fuel ratio control and the output air-fuel ratio of the downstream side air-fuel ratio sensor changes from an air-fuel ratio richer than a predetermined lean judged air-fuel ratio leaner than the stoichiometric air-fuel ratio to an air-fuel ratio leaner than the predetermined lean judged air-fuel ratio.

2. The exhaust purification system of an internal combustion engine according to claim 1, wherein
    in the air-fuel ratio control, the control device further performs feedback control of an amount of fuel fed to a combustion chamber of the internal combustion engine so that the air-fuel ratio of the exhaust gas flowing into the exhaust purification catalyst becomes a target air-fuel ratio, and learning control correcting a parameter relating to the air-fuel ratio based on the output air-fuel ratio of the downstream side air-fuel ratio sensor,
    in the air-fuel control, the control device alternately switches the target air-fuel ratio between a rich air-fuel ratio and a lean air-fuel ratio and, when the output air-fuel ratio of the downstream side air-fuel ratio sensor becomes equal to or less than a predetermined rich judged air-fuel ratio that is richer than the stoichiometric air-fuel ratio, switches the target air-fuel ratio from the rich air-fuel ratio to the lean air-fuel ratio,
    in the learning control, the control device corrects a parameter relating to the air-fuel ratio based on a cumulative oxygen excess amount, which is a cumulative value of an amount of oxygen becoming in excess when making the air-fuel ratio of the exhaust gas flowing into the exhaust purification catalyst the stoichiometric air-fuel ratio in an oxygen increase time period from when switching the target air-fuel ratio to the lean air-fuel ratio to when again switching the target air-fuel ratio to the rich air-fuel ratio, and a cumulative oxygen deficiency amount, which is a cumulative value of an amount of oxygen becoming deficient when making the air-fuel ratio of the exhaust gas flowing into the exhaust purification catalyst the stoichiometric air-fuel ratio in an oxygen decrease time period from when switching the target air-fuel ratio to the rich air-fuel ratio to when again switching the target air-fuel ratio to the lean air-fuel ratio, so that the control device reduces a difference between the cumulative oxygen excess amount and the cumulative oxygen deficiency amount and,
    if judging that the downstream side air-fuel ratio sensor has become abnormal when the target air-fuel ratio is set to the rich air-fuel ratio, the control device stops correction of the parameter relating to the air-fuel ratio based on the cumulative oxygen deficiency amount at this time even if after that the output air-fuel ratio of the downstream side air-fuel ratio sensor becomes less than or equal to the predetermined rich judged air-fuel ratio and the target air-fuel ratio is switched to the lean air-fuel ratio.

3. The exhaust purification system of an internal combustion engine according to claim 2, wherein, when the target air-fuel ratio is set to the rich air-fuel ratio, the output air-fuel ratio of the downstream side air-fuel ratio sensor changes from an air-fuel ratio richer than the predetermined lean judged air-fuel ratio to an air-fuel ratio leaner than the predetermined lean judged air-fuel ratio, and thereby it is judged that the downstream side air-fuel ratio sensor has become abnormal, the control device calculates the cumulative oxygen deficiency amount in a time period from when switching the target air-fuel ratio to the rich air-fuel ratio a last time to when the output air-fuel ratio of the downstream side air-fuel ratio sensor changes from an air-fuel ratio richer than the predetermined lean judged air-fuel ratio to an air-fuel ratio leaner than the predetermined lean judged air-fuel ratio, and corrects the parameter relating to the air-fuel ratio so that the control device reduces the difference between the cumulative oxygen deficiency amount and the cumulative oxygen excess amount.

4. The exhaust purification system of an internal combustion engine according to claim 3, wherein,
in the air-fuel ratio control, the control device alternately switches the target air-fuel ratio between a constant rich set air-fuel ratio richer than the stoichiometric air-fuel ratio and a constant lean set air-fuel ratio leaner than the stoichiometric air-fuel ratio, and
the control device reduces a rich degree of the rich set air-fuel ratio if judging that the downstream side air-fuel ratio sensor has become abnormal by the abnormal diagnosis control.

5. The exhaust purification system of an internal combustion engine according to claim 4, wherein,
in the air-fuel ratio control, if defining a time period setting the target air-fuel ratio to the rich air-fuel ratio and lean air-fuel ratio one time each as one cycle,
the control device reduces the rich degree of the rich set air-fuel ratio if, during a given number of cycles, a ratio of a number of times the downstream side air-fuel ratio sensor is judged to be abnormal to the given number of cycles is greater than or equal to a predetermined value.

6. The exhaust purification system of an internal combustion engine according to claim 5, wherein,
in the air-fuel ratio control, the control device switches the air-fuel ratio of the exhaust gas flowing into the exhaust purification catalyst from the rich air-fuel ratio to the lean air-fuel ratio when the output air-fuel ratio of the downstream side air-fuel ratio sensor becomes equal to or less than a predetermined rich judged air-fuel ratio richer than the stoichiometric air-fuel ratio, and switches the air-fuel ratio of the exhaust gas flowing into the exhaust purification catalyst from the lean air-fuel ratio to the rich air-fuel ratio when an oxygen storage amount of the exhaust purification catalyst becomes greater than or equal to a predetermined switching reference oxygen amount, said predetermined switching reference oxygen amount being less than a maximum storable oxygen amount.

7. The exhaust purification system of an internal combustion engine according to claim 4, wherein,
in the air-fuel ratio control, the control device switches the air-fuel ratio of the exhaust gas flowing into the exhaust purification catalyst from the rich air-fuel ratio to the lean air-fuel ratio when the output air-fuel ratio of the downstream side air-fuel ratio sensor becomes equal to or less than a predetermined rich judged air-fuel ratio richer than the stoichiometric air-fuel ratio, and switches the air-fuel ratio of the exhaust gas flowing into the exhaust purification catalyst from the lean air-fuel ratio to the rich air-fuel ratio when an oxygen storage amount of the exhaust purification catalyst becomes greater than or equal to a predetermined switching reference oxygen amount, said predetermined switching reference oxygen amount being less than a maximum storable oxygen amount.

8. The exhaust purification system of an internal combustion engine according to claim 3, wherein,
in the air-fuel ratio control, the control device switches the air-fuel ratio of the exhaust gas flowing into the exhaust purification catalyst from the rich air-fuel ratio to the lean air-fuel ratio when the output air-fuel ratio of the downstream side air-fuel ratio sensor becomes equal to or less than a predetermined rich judged air-fuel ratio richer than the stoichiometric air-fuel ratio, and switches the air-fuel ratio of the exhaust gas flowing into the exhaust purification catalyst from the lean air-fuel ratio to the rich air-fuel ratio when an oxygen storage amount of the exhaust purification catalyst becomes greater than or equal to a predetermined switching reference oxygen amount, said predetermined switching reference oxygen amount being less than a maximum storable oxygen amount.

9. The exhaust purification system of an internal combustion engine according to claim 2, wherein,
in the air-fuel ratio control, the control device alternately switches the target air-fuel ratio between a constant rich set air-fuel ratio richer than the stoichiometric air-fuel ratio and a constant lean set air-fuel ratio leaner than the stoichiometric air-fuel ratio, and
the control device reduces a rich degree of the rich set air-fuel ratio if judging that the downstream side air-fuel ratio sensor has become abnormal by the abnormal diagnosis control.

10. The exhaust purification system of an internal combustion engine according to claim 9, wherein,
in the air-fuel ratio control, if defining a time period setting the target air-fuel ratio to the rich air-fuel ratio and lean air-fuel ratio one time each as one cycle,
the control device reduces the rich degree of the rich set air-fuel ratio if, during a given number of cycles, a ratio of a number of times the downstream side air-fuel ratio sensor is judged to be abnormal to the given number of cycles is greater than or equal to a predetermined value.

11. The exhaust purification system of an internal combustion engine according to claim 10, wherein,
in the air-fuel ratio control, the control device switches the air-fuel ratio of the exhaust gas flowing into the exhaust purification catalyst from the rich air-fuel ratio to the lean air-fuel ratio when the output air-fuel ratio of the downstream side air-fuel ratio sensor becomes equal to or less than a predetermined rich judged air-fuel ratio richer than the stoichiometric air-fuel ratio, and switches the air-fuel ratio of the exhaust gas flowing into the exhaust purification catalyst from the lean air-fuel ratio to the rich air-fuel ratio when an oxygen storage amount of the exhaust purification catalyst becomes greater than or equal to a predetermined switching reference oxygen amount, said predetermined switching reference oxygen amount being less than a maximum storable oxygen amount.

12. The exhaust purification system of an internal combustion engine according to claim 9, wherein, in the air-fuel ratio control, the control device switches the air-fuel ratio of the exhaust gas flowing into the exhaust purification catalyst from the rich air-fuel ratio to the lean air-fuel ratio when the output air-fuel ratio of the downstream side air-fuel ratio sensor becomes equal to or less than a predetermined rich judged air-fuel ratio richer than the stoichiometric air-fuel ratio, and switches the air-fuel ratio of the exhaust gas flowing into the exhaust purification catalyst from the lean air-fuel ratio to the rich air-fuel ratio when an oxygen storage amount of the exhaust purification catalyst becomes greater than or equal to a predetermined switching reference oxygen amount, said predetermined switching reference oxygen amount being less than a maximum storable oxygen amount.

13. The exhaust purification system of an internal combustion engine according to claim 2, wherein, in the air-fuel ratio control, the control device switches the air-fuel ratio of the exhaust gas flowing into the exhaust purification catalyst from the rich air-fuel ratio to the lean air-fuel ratio when the output air-fuel ratio of the downstream side air-fuel ratio sensor becomes equal to or less than a predetermined rich judged air-fuel ratio richer than the stoichiometric air-fuel ratio, and switches the air-fuel ratio of the exhaust gas flowing into the exhaust purification catalyst from the lean air-fuel ratio to the rich air-fuel ratio when an oxygen storage amount of the exhaust purification catalyst becomes greater than or equal to a predetermined switching reference oxygen amount, said predetermined switching reference oxygen amount being less than a maximum storable oxygen amount.

14. The exhaust purification system of an internal combustion engine according to claim 1, wherein, in the air-fuel ratio control, the control device switches the air-fuel ratio of the exhaust gas flowing into the exhaust purification catalyst from the rich air-fuel ratio to the lean air-fuel ratio when the output air-fuel ratio of the downstream side air-fuel ratio sensor becomes equal to or less than a predetermined rich judged air-fuel ratio richer than the stoichiometric air-fuel ratio, and switches the air-fuel ratio of the exhaust gas flowing into the exhaust purification catalyst from the lean air-fuel ratio to the rich air-fuel ratio when an oxygen storage amount of the exhaust purification catalyst becomes greater than or equal to a predetermined switching reference oxygen amount, said predetermined switching reference oxygen amount being less than a maximum storable oxygen amount.

* * * * *